United States Patent
Miyamoto et al.

(10) Patent No.: US 12,254,701 B2
(45) Date of Patent: Mar. 18, 2025

(54) VEHICLE PERIPHERY MONITORING DEVICE AND VEHICLE PERIPHERY MONITORING METHOD

(71) Applicants: DENSO CORPORATION, Kariya (JP); TOYOTA JIDOSHA KABUSHIKI KAISHA, Toyota (JP)

(72) Inventors: Yousuke Miyamoto, Kariya (JP); Akihiro Kida, Toyota (JP); Motonari Ohbayashi, Nagakute (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 408 days.

(21) Appl. No.: 17/658,222

(22) Filed: Apr. 6, 2022

(65) Prior Publication Data

US 2022/0230446 A1  Jul. 21, 2022

Related U.S. Application Data

(63) Continuation of application No. PCT/JP2020/031837, filed on Aug. 24, 2020.

(30) Foreign Application Priority Data

Oct. 11, 2019  (JP) .................. 2019-188086

(51) Int. Cl.
G06V 20/58  (2022.01)
B60Q 9/00  (2006.01)
G06T 7/70  (2017.01)

(52) U.S. Cl.
CPC ............. G06V 20/58 (2022.01); G06T 7/70 (2017.01); *B60Q 9/00* (2013.01); *G06T 2207/30248* (2013.01)

(58) Field of Classification Search
CPC ...... G06V 20/586; G06V 20/58; G06V 20/56; B60Q 9/00; G06T 7/70
See application file for complete search history.

(56) References Cited

U.S. PATENT DOCUMENTS

2010/0034426 A1 * 2/2010 Takiguchi .......... G01C 21/3602
382/106
2013/0010074 A1  1/2013 Takiguchi et al.
(Continued)

FOREIGN PATENT DOCUMENTS

JP  2011-150633 A  8/2011
JP  2015-229400 A  12/2015
(Continued)

*Primary Examiner* — Khoi H Tran
*Assistant Examiner* — Tristan J Greiner
(74) *Attorney, Agent, or Firm* — Maschoff Brennan

(57) ABSTRACT

A vehicle periphery monitoring device is configured to: specify positions of detection points of an obstacle with respect to a vehicle based on detection results of multiple periphery monitoring sensors equipped to the vehicle; update the positions of the detected detection points corresponding to a position change of the vehicle; storing the updated positions of the detection points in a memory that maintains stored information during a parked state of the vehicle; and estimate, at a start time of the vehicle from the parked state, a position of a detection point, which is located in a blind spot and is not detected by all of the multiple periphery monitoring sensors at the start time of the vehicle, using the positions of the detection points stored in the memory.

8 Claims, 8 Drawing Sheets

(56) References Cited

U.S. PATENT DOCUMENTS

| | | | |
|---|---|---|---|
| 2013/0011013 A1 | 1/2013 | Takiguchi et al. | |
| 2013/0162826 A1* | 6/2013 | Zhang | G06V 20/58 |
| | | | 348/148 |
| 2013/0223686 A1* | 8/2013 | Shimizu | G06T 7/246 |
| | | | 382/103 |
| 2016/0203377 A1 | 7/2016 | Irie et al. | |
| 2018/0089538 A1* | 3/2018 | Graham | G06V 20/56 |
| 2018/0370566 A1 | 12/2018 | Kojo et al. | |
| 2021/0323538 A1* | 10/2021 | Takahashi | G08G 1/143 |

FOREIGN PATENT DOCUMENTS

| | | | | |
|---|---|---|---|---|
| JP | 2018-12451 A | | 1/2018 | |
| JP | 2018012451 A | * | 1/2018 | |
| JP | 2019-89476 A | | 6/2019 | |
| JP | 2019089476 A | * | 6/2019 | |

* cited by examiner though the periphery monitoring sensors are used.

VEHICLE PERIPHERY MONITORING DEVICE AND VEHICLE PERIPHERY MONITORING METHOD

CROSS REFERENCE TO RELATED APPLICATIONS

The present application is a continuation application of International Patent Application No. PCT/JP2020/031837 filed on Aug. 24, 2020, which designated the U.S. and claims the benefit of priority from Japanese Patent Application No. 2019-188086 filed on Oct. 11, 2019. The entire disclosures of all of the above applications are incorporated herein by reference.

TECHNICAL FIELD

The present disclosure relates to a vehicle periphery monitoring device and a vehicle periphery monitoring method.

BACKGROUND

There has been known a technique that confirms a presence of an obstacle around a vehicle when the vehicle starts moving from a parked state using periphery monitoring sensors that monitor a surrounding of the vehicle.

SUMMARY

The present disclosure provides a vehicle periphery monitoring device, which is configured to: specify positions of detection points of an obstacle with respect to a vehicle based on detection results of multiple periphery monitoring sensors equipped to the vehicle; update the positions of the detected detection points corresponding to a position change of the vehicle; storing the updated positions of the detection points in a memory that maintains stored information during a parked state of the vehicle; and estimate, at a start time of the vehicle from the parked state, a position of a detection point, which is located in a blind spot and is not detected by all of the multiple periphery monitoring sensors at the start time of the vehicle, using the positions of the detection points stored in the memory.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
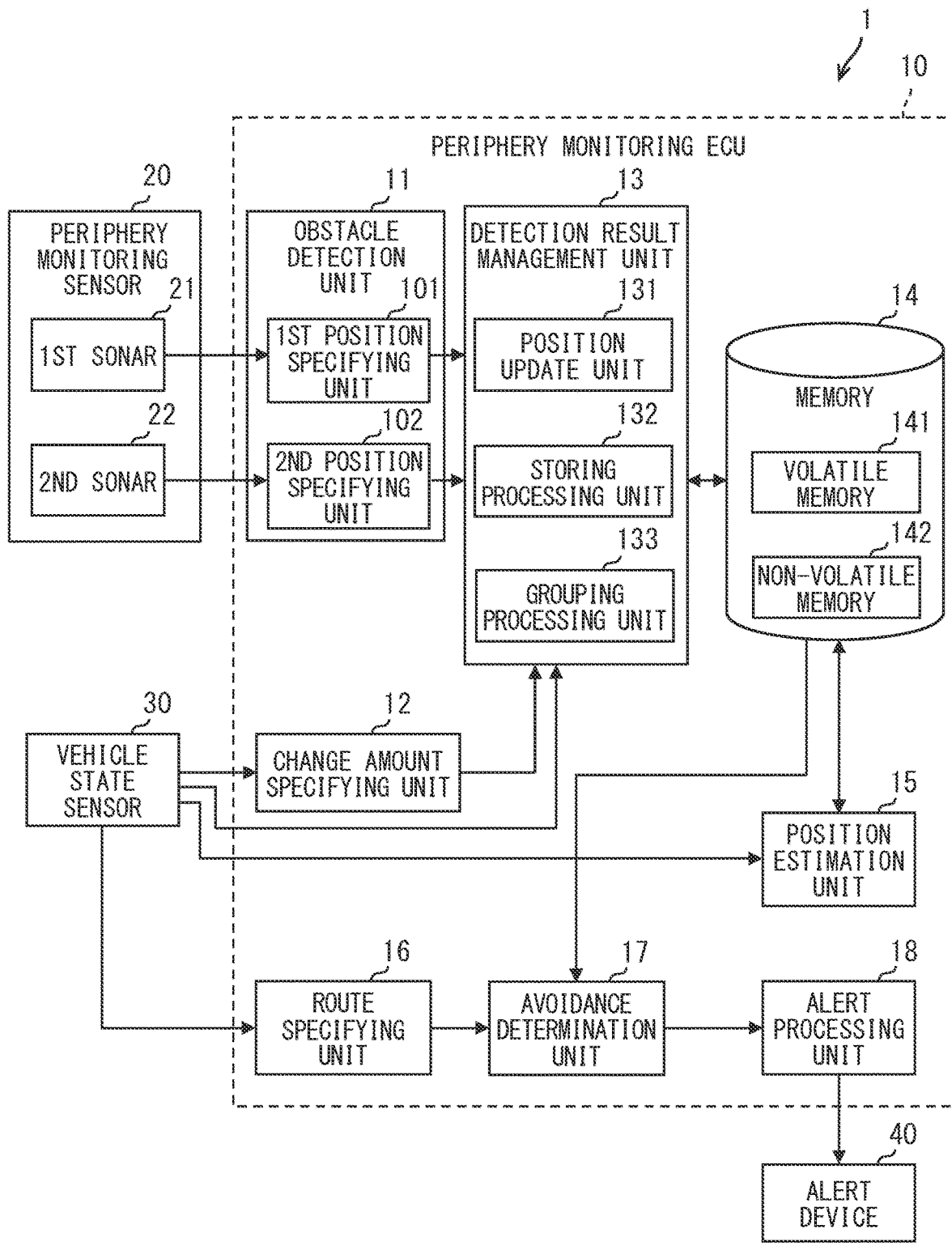
FIG. 1 is a diagram showing an example of a schematic configuration of a vehicle system 1 and a periphery monitoring ECU.

Usually, a periphery monitoring sensor is provided by an autonomous driving sensor. In response to an operation made by a driver for moving a vehicle, the periphery monitoring sensor detects a surrounding of the vehicle, sets an alert area to which the driver is required to pay attention, and detects a moving object within the set area.

In a case where multiple periphery monitoring sensors, such as cameras and sonars are used to monitor a surrounding of the vehicle, each periphery monitoring sensor individually performs object detection around the vehicle from one another within own individual detection range. Thus, a blind spot that is not covered by the detection ranges of the sensors may exist around the vehicle. In order to improve a position detection accuracy of an obstacle, for all of the sensors, such as the camera or the sonar, it is necessary to decrease the detection range and increase a resolution. Therefore, with an increase of the position detection accuracy of the obstacle, the blind spot is more likely to generate. When such a blind spot exists, even though multiple periphery monitoring sensors are used, the periphery monitoring sensors may fail to detect and recognize the obstacle existing in the blind spot between two adjacent detection ranges of the periphery monitoring sensors at a time of the vehicle start. Thus, it is difficult to avoid moving of the vehicle close to the obstacle.

According to an aspect of the present disclosure, a vehicle periphery monitoring device, which is applied to a vehicle equipped with multiple periphery monitoring sensors is provided. A blind spot exists between two adjacent detection ranges of the multiple periphery monitoring sensors. The vehicle periphery monitoring device includes: a detection point position specifying unit that specifies positions of detection points of an obstacle with respect to the vehicle based on detection results of the multiple periphery monitoring sensors; a position update unit that updates the positions of the detection points, which are successively detected by the detection point position specifying unit, corresponding to a position change of the vehicle; a storing processing unit that stores the positions of the detection points, which are updated by the position update unit, in a memory that maintains stored information during a parked state of the vehicle; and a position estimation unit that estimates, at a start time of the vehicle from the parked state, a position of a detection point, which is located in the blind spot and is not detected by all of the multiple periphery monitoring sensors at the start time of the vehicle, using the positions of the detection points stored in the memory by the storing processing unit.

According to another aspect of the present disclosure, a vehicle periphery monitoring method, which is applied to a vehicle equipped with multiple periphery monitoring sensors, is provided. A blind spot exists between two adjacent detection ranges of the multiple periphery monitoring sensors. The vehicle periphery monitoring method includes: specifying positions of detection points of an obstacle with respect to the vehicle based on detection results of the multiple periphery monitoring sensors; updating the positions of the detections points, which are successively detected, corresponding to a position change of the vehicle; storing the updated positions of the detection points in a memory that maintains stored information during a parked state of the vehicle; and estimating, at a start time of the vehicle from the parked state, a position of a detection point, which is located in the blind spot and is not detected by all of the multiple periphery monitoring sensors at the start time of the vehicle, using the positions of the detection points stored in the memory.

According to the above configuration, the positions of detection points of the obstacle with respect to the vehicle can be specified based on detection results of the periphery monitoring sensors, which has a blind spot between two adjacent detection ranges of the periphery monitoring sensors. The positions of the detections points, which are successively detected, are updated corresponding to a position change of the vehicle Thus, even when the detection point exists in the blind spot during the parking state of vehicle, under a condition that the detection point has been detected in the past, the position of detection point with respect to the vehicle can be indicated by the updated position during the parking state. Thus, even when the detection range of the periphery monitoring sensor is narrowed down to improve the position detection accuracy of the obstacle, the updated position of obstacle with respect to the vehicle can be indicated during the parking state. In the parking state of the vehicle, the updated positions of obstacle detection points are stored in the memory that does not erase the stored contents even after the parking is completed and the power switch is turned off. Thus, the updated positions can be kept in the stored state until the vehicle starts moving from the parked state. At the start time of the vehicle from the parked state, by using the positions of detection points corresponding to the same obstacle, which are stored in the memory, the position of detection point, which is located in the blind spot between adjacent detection ranges in the horizontal direction and is not detected by all of the periphery monitoring sensors at the start time of the vehicle, can be estimated. When it is possible to estimate the position of the detection point of the obstacle, which exists in the blind spot and cannot be specified at the start time of vehicle by the sensors, moving of the vehicle proximity to the obstacle can be avoided. As a result, when multiple periphery monitoring sensors are used to monitor the periphery of the vehicle, the parked vehicle is started with improved position detection accuracy of the obstacle using the periphery monitoring sensors. Thus, the configuration in first embodiment enables an avoidance of the proximity of subject vehicle to the obstacle existing in the blind spot between the detection ranges of the periphery monitoring sensors in the horizontal direction.

Thus, the vehicle periphery monitoring device and the vehicle periphery monitoring method can increases a position detection accuracy of an obstacle in a case where multiple periphery monitoring sensors are used for monitoring a periphery of the vehicle. When multiple periphery monitoring sensors are used to monitor the periphery of the vehicle, the vehicle is parked while improving the detection accuracy of the position of the obstacle using the periphery monitoring sensor. The vehicle periphery monitoring device and the vehicle periphery monitoring method can make it easier to avoid proximity to an obstacle existing in a blind spot between the detection ranges of the periphery monitoring sensor in the horizontal direction when starting the vehicle.

The following will describe embodiments of the present disclosure with reference to the accompanying drawings. For convenience of description, the parts having the same functions as the parts shown in the drawings used in the description up to that point in multiple embodiments may be designated by the same reference symbols and the description thereof may be omitted. The description of other embodiments may be referred to with respect to these portions given the same reference symbols.

(Configuration of Vehicle System 1)

The following will describe a first embodiment of the present disclosure with reference to the accompanying drawings. A vehicle system 1 shown in FIG. 1 is mounted on a vehicle. As shown in FIG. 1, the vehicle system 1 includes a periphery monitoring ECU 10, a periphery monitoring sensor 20, a vehicle state sensor(s) 30, and an alert device 40. Although the vehicle using the vehicle system 1 is not necessarily limited to an automobile, hereinafter, an example using the automobile will be described.

The periphery monitoring sensor 20 is an autonomous sensor that monitors a periphery environment of a subject vehicle. The periphery monitoring sensor 20 is used to detect an object (that is, an obstacle) existing around the subject vehicle. For example, the periphery monitoring sensor 20 may be a periphery monitoring camera that captures an image of predetermined range around the subject vehicle. The periphery monitoring sensor 20 may be a distance measuring sensor that emits a scanning wave toward a predetermined range around the subject vehicle. For example, the distance measuring sensor may be a millimeter wave radar, a sonar, or a lidar. The distance measuring sensor is a sensor that emits the scanning wave and receives the reflected wave of the scanning wave after the scanning wave is reflected by the obstacle existing within a reach range of the scanning wave. In this way, the distance measuring sensor detects an existence of the obstacle and a distance to the obstacle.

In the distance measuring sensor, the received information of the reflected wave of the scanning wave corresponds to a sensing result. The periphery monitoring camera can detect a presence of obstacle in the captured image using image recognition processing. In the periphery monitoring camera, the captured image corresponds to a sensing result. The periphery monitoring camera can also detect the distance from the subject vehicle to the obstacle (hereinafter referred to as an obstacle distance) based on the captured image. As an example, the obstacle distance may be detected by calculating a position of the recognized obstacle using the corresponding pixel in a vertical direction in the captured image. As the periphery monitoring sensor 20, for example, multiple different types of periphery monitoring sensors 20 may be used in combination so as to cover the entire periphery of the subject vehicle. For example, a periphery monitoring camera and a distance measuring sensor may be used in combined manner.

Multiple periphery monitoring sensors 20 may have a blind spot between two adjacent detection ranges in a horizontal direction. The following will describe an example in which multiple sonars are used as the periphery monitoring sensors 20.

Figure 2:
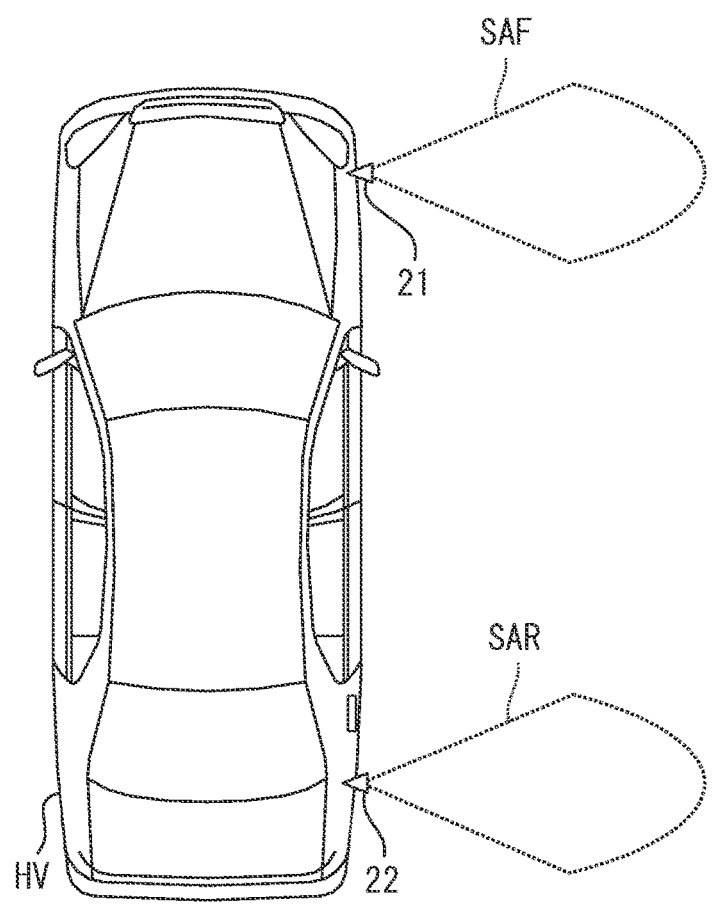
FIG. 2 is a diagram showing an arrangement example of periphery monitoring sensors 20 with respect to a vehicle.

An arrangement example of periphery monitoring sensors 20 with respect to the subject vehicle will be described with reference to FIG. 2. FIG. 2 shows an example in which a first sonar 21 and a second sonar 22 are used as the periphery monitoring sensors 20. The symbol HV in FIG. 2 indicates the subject vehicle. The symbol SAF in FIG. 2 indicates a detection range of the first sonar 21. The symbol SAR in FIG. 2 indicates a detection range of the second sonar 22. The same applies to other figures.

The first sonar 21 is attached to a right surface of a front portion of the subject vehicle. The first sonar 21 is used to detect an obstacle existing on the right side of the front portion of the subject vehicle. The second sonar 22 is attached to a right surface of a rear portion of the subject vehicle. The second sonar 22 is used to detect an obstacle existing on the right side of the rear portion of the subject vehicle.

The first sonar 21 and the second sonar 22 are arranged on the right surface of the subject vehicle as an example. However, the present disclosure is not limited to this configuration. The first sonar 21 and the second sonar 22 may be arranged on a left surface of the subject vehicle. The first sonar 21 and the second sonar 22 may be arranged on a left surface and a right surface of the subject vehicle, respectively. The first sonar 21 and the second sonar 22 may be arranged on a front surface of the subject vehicle in order to detect an obstacle existing in front of the subject vehicle. The first sonar 21 and the second sonar 22 may be arranged on a rear surface of the subject vehicle in order to detect an obstacle existing in rear side of the subject vehicle. The number of sonars is not limited to two as long as plural number of sonars are arranged. For convenience, in the following description, an example in which the first sonar 21 is arranged on the right surface of the front portion of the subject vehicle and the second sonar 22 is arranged on the right surface of the rear portion of the subject vehicle will be described. That is, the two sonars are arranged side by side on the right surface of the subject vehicle.

For example, the first sonar 21 is arranged on a right surface of a front bumper of the subject vehicle. The second sonar 22 is arranged on a right surface of a rear bumper of the subject vehicle. Since the location for mounting a sonar is required to be made of material capable of converging a vibration easily, the first sonar 21 and the second sonar 22 are attached to the bumper. For example, each of the first sonar 21 and the second sonar 22 are arranged so that a center line of directivity of the sonar is parallel to an axle direction of the subject vehicle HV. In the present embodiment, the detection range SAF of the first sonar 21 and the detection range SAR of the second sonar 22 are arranged on a right side of the subject vehicle in a direction parallel to a front-rear direction of the subject vehicle HV. For each of the first sonar 21 and the second sonar 22, the directivity center line may be arranged at an angle of, for example, about 40° from the axle direction of the subject vehicle HV. In order to increase the position detection accuracy of obstacle, the directivity of each of the first sonar 21 and the second sonar 22 is required to be narrowed down under a condition that a sufficient area can be ensured for transmitting exploration wave and receiving reflected wave within an assumed vehicle speed range.

The vehicle state sensor(s) 30 is a cluster of sensors that detect various states of the subject vehicle, such as a traveling state and an operation state. The vehicle state sensor(s) 30 includes a vehicle speed sensor, a steering sensor, an acceleration sensor, a yaw rate sensor, a shift position sensor, a parking brake switch, and the like. The vehicle speed sensor detects a speed of the subject vehicle. The steering sensor detects a steering angle of the subject vehicle. The acceleration sensor detects the acceleration in a front-rear direction of the subject vehicle and the acceleration in a left-right direction of the subject vehicle. The acceleration sensor may also detect a deceleration of the subject vehicle, that is, a negative acceleration. The yaw rate sensor detects an angular velocity of the subject vehicle. The shift position sensor detects a shift position of the subject vehicle. The parking brake switch outputs a signal according to on/off state of a parking brake of the subject vehicle.

The alert device 40 outputs an alert to the driver of the subject vehicle. Examples of the alert device 40 include a display device, a buzzer, and the like. When the display device is used as the alert device, the driver may be alerted by the display. The display device 41 may alert the driver by displaying an image, an icon, a text, or the like on a display screen. The display device 41 may be provided by a CID (center information display). For example, the CID is arranged in the center cluster of the vehicle. The display device 41 may be provided by another display, such as a display of a navigation device or a HUD (head-up display). When the buzzer is used as the alert device, the buzzer notifies an alert to the driver by outputting an audio signal.

For example, a device other than the display device and the buzzer may be used as the alert device to issue a warning to the driver. For example, the driver may be alerted by an audio signal output from an audio output device. Further, the driver may be alerted by a vibration of vibrator arranged at a portion, such as a steering wheel, a seat back where the driver contacts in tactile manner. Alternatively, the driver may be alerted by a light emitted from a light emitting element, such as an LED.

The periphery monitoring ECU 10 includes, for example, a processor, a memory, an I/O, and a bus connecting these components. The periphery monitoring ECU executes a control program stored in a memory to perform a process (hereinafter referred to as a periphery monitoring related process) related to monitoring of an obstacle existing around the subject vehicle. The memory referred to here is a non-transitory tangible storage medium that stores computer-readable programs and computer-readable data. The non-transitory tangible storage medium may be provided by a semiconductor memory, a magnetic disk, or the like. The periphery monitoring ECU 10 corresponds to the vehicle periphery monitoring device. The details of the periphery monitoring ECU 10 will be described below.

(Configuration of Periphery Monitoring ECU 10)

The following will describe a schematic configuration of the periphery monitoring ECU 10 with reference to FIG. 1. As shown in FIG. 1, the periphery monitoring ECU 10 includes, as functional blocks, an obstacle detection unit 11, a change amount specifying unit 12, a detection result management unit 13, a memory 14, a position estimation unit 15, a route specifying unit 16, an avoidance determination unit 17, and an alert processing unit 18. A part of or entire functional blocks executed by the periphery monitoring ECU 10 may be implemented as a hardware, such as one or more ICs or the like. Alternatively, a part of or entire functional blocks executed by the periphery monitoring ECU 10 may be implemented as a combination of software and hardware. In software manner, the functions are executed by at least one processor.

The obstacle detection unit 11 detects an obstacle existing around the subject vehicle by using the sensing result of the periphery monitoring sensor 20. The obstacle detection unit 11 detects a presence of obstacle around the subject vehicle and a position of the obstacle with respect to the subject vehicle. The position of the obstacle with respect to the subject vehicle may be specified based on a distance from the periphery monitoring sensor 20 to the obstacle, a direction toward the obstacle, and a mounting position of the periphery monitoring sensor 20. The distance from the periphery monitoring sensor 20 to the obstacle is specified by using the sensing result of the periphery monitoring sensor 20. The direction toward the obstacle is specified based on a detection direction of the periphery monitoring sensor 20 with respect to the subject vehicle. The mounting position of the periphery monitoring sensor 20 indicates a position of the periphery monitoring sensor 20 with respect to a reference point of the subject vehicle. The reference point of the subject vehicle may be determined as necessary. As an example, a center position of rear wheel axle in a vehicle width direction may be set as the reference point of the subject vehicle. Alternatively, on a center line of the vehicle equidistant from left and right sides of the subject vehicle, a point that has the same distance to the front end and to the rear end of the subject vehicle may be set as the reference point. The position of the obstacle with respect to the subject vehicle may be represented as coordinates in a XY coordinate system with the reference point of the subject vehicle as the original point. In this XY coordinate system, an X-axis and a Y-axis are set on a horizontal plane parallel to a road surface.

Information related to the detection direction of the periphery monitoring sensor 20 of the subject vehicle and the mounting position of the periphery monitoring sensor 20 with respect to the reference point of the subject vehicle (hereinafter referred to as a sensor position) may be stored in advance in a non-volatile memory of the periphery monitoring ECU 10. Regarding the direction of the obstacle, when the periphery monitoring sensor 20 is a distance measuring sensor, the distance measuring sensor may detect the direction of the obstacle based on the reception time difference between two reflected wave receiving elements that respectively receive the reflected waves corresponding to the same scanning wave.

The position of the obstacle with respect to the subject vehicle, which is to be detected by the obstacle detection unit 11, corresponds the position of the obstacle detection point. When the periphery monitoring sensor 20 is a distance measuring sensor, the detection point corresponds to a reflection point where the obstacle reflects the scanning wave. When the periphery monitoring sensor 20 is a periphery monitoring camera, the detection point corresponds to, for example, a feature point of the obstacle that has been recognized by image processing. The obstacle detection unit 11 sequentially detects the position of the detection point of the obstacle.

In the present embodiment, the obstacle detection unit 11 includes a first position specifying unit 101 and a second position specifying unit 102 as sub-functional blocks. The obstacle detection unit 11, the first position specifying unit 101, and the second position specifying unit 102 correspond to a detection point position specifying unit. The first position specifying unit 101 specifies a position of the obstacle with respect to the subject vehicle by using the sensing result of the first sonar 21. Herein, the obstacle is detected within the detection range of the first sonar 21. The second position specifying unit 102 specifies a position of the obstacle with respect to the subject vehicle by using the sensing result of the second sonar 22. Herein, the obstacle is detected within the detection range of the second sonar 22. As described above, each of the first position specifying unit 101 and the second position specifying unit 102 specifies the position of the obstacle detection point (hereinafter, simply referred to as detection point) as the position of the obstacle with respect to the subject vehicle. Both of the position of the detection point specified by the first position specifying unit 101 and the position of the detection point specified by the second position specifying unit 102 are represented as coordinates on the same XY coordinate system.

A process (that is, sensing process) in which each of the first sonar 21 and the second sonar 22 transmits the exploration wave and then receives the reflected exploration wave may be periodically executed at a predetermined cycle in a state where a control signal instructing the periphery monitoring ECU 10 to perform sensing is in put to the sonars from the periphery monitoring ECU 10. The obstacle detection unit 11 may be configured to detect one detection point for in one sensing operation with one sonar. When a periphery monitoring sensor 20 such as a camera other than sonar is used, it may be configured to detect multiple detection points in one sensing operation. For example, a condition for performing the sensing operation may be satisfied when the vehicle speed is lower than a predetermined speed. The predetermined speed referred to here may be appropriately set as necessary. For example, the predetermined speed may be set to a low speed, such as 40 km/h.

The change amount specifying unit 12 specifies a change amount of the subject vehicle position within a predetermined period based on a travelling state of the subject vehicle sequentially detected by the vehicle state sensor(s) 30. The position of the subject vehicle may be set as the reference point of the subject vehicle. For example, the change amount specifying unit 12 may specify the change amount of the subject vehicle position for each cycle of sensing operation of the periphery monitoring sensor 20 that periodically detects the position of the detection point of the obstacle. As an example, the change amount specifying unit 12 specifies the change amount of the subject vehicle position based on the vehicle speed of the subject vehicle, which is sequentially detected by the vehicle speed sensor, and the steering angle of the subject vehicle, which is sequentially detected by the steering angle sensor.

The detection result management unit 13 manages information about at least one detection point detected by the obstacle detection unit 11 as detection point management data. The detection point management data is data in which the relative position of the detection point with respect to the current position of the subject vehicle is represented by the XY coordinate system with the reference point of the subject vehicle as the original point. The detection point management data is sequentially updated as the position of the vehicle changes or the detection points are added. For example, the detection result management unit 13 may exclude, from the detection point management data, detection points positioned away from the subject vehicle by a certain distance or longer. The detection result management unit 13 includes, as sub-functional blocks, a position update unit 131, a storing processing unit 132, and a grouping processing unit 133.

The position update unit 131 updates the positions of the detection points sequentially specified by the first position specifying unit 101 and the second position specifying unit 102 according to the position change of the subject vehicle. As an example, the position update unit 131 performs, to the positions of the detection points, a position change corresponding to the position change amount of the subject vehicle specified by the change amount specifying unit 12 so that the position of each detection point in the XY coordinate system can be updated. As a result, even when the detection point moves out of the detection range of the periphery monitoring sensor 20, the relative position of each detection point with respect to the subject vehicle position can be continuously specified.

The storing processing unit 132 stores the detection point management data in the memory 14. The memory 14 may be provided by a rewritable storage medium. The memory 14 includes a volatile memory 141 and a non-volatile memory 142. The storing processing unit 132 may be configured to store the detection point management data in the volatile memory 141 in a traveling state of the vehicle before a parking state of the vehicle. The parking state is a moving state of the vehicle for parking purpose. The parking state of the vehicle may be specified by the detection result management unit 13 in response to the shift position sensor included in the vehicle state sensor(s) 30 detecting a shift position change to the parking position. Alternatively, the detection result management unit 13 may specify the parking state of the subject vehicle based on an activation signal of the parking brake switch, which is included in the vehicle state sensor(s) 30. The detection point management data stored in the volatile memory 141 is configured to be deleted when a power supply by a power source to the volatile memory 141 is turned off in response to turning off a switch (hereinafter referred to as a power switch) for starting an internal combustion engine or a motor generator of the subject vehicle.

When a new detection point having different position from that of the detection point stored in the volatile memory 141 is specified by the first position specifying unit 101 and the second position specifying unit 102, the storing processing unit 132 stores the position of new detection point in the volatile memory 141. When the position of detection point is updated in the position update operation of the detection point executed by the position update unit 131, the storing processing unit 132 rewrites the position of the detection point stored in the volatile memory 141 to the updated position. In a case where the updated position of the detection point detected by one of the first sonar 21 or the second sonar 22 matches with, for example, be identical to the position of the detection point detected by the other sonar, the detection point detected by one sonar and the detection point detected by the other sonar may be managed as the same detection point. The position matching referred to herein indicates a substantial matching including an allowable error.

The above-mentioned control program, vehicle body shape information, detection range information, and the like may be stored in advance in the non-volatile memory 142. The vehicle body shape information is information related to a vehicle body shape of the subject vehicle. Examples of the vehicle body shape information include information on the vehicle height, vehicle width, and vehicle length of the subject vehicle. The vehicle body shape information may further include the position of each part of the vehicle body, such as each wheel with respect to the reference point of the subject vehicle and the sensor position with respect to the reference point of the subject vehicle. The detection range information is information on the detection range of the periphery monitoring sensor 20. For example, the detection range information may be information indicating the detection range of the first sonar 21 and the detection range of the second sonar 22 in the XY coordinate system. The detection range may be represented as a range that extends from the sensor position of each sonar in the XY coordinate system.

The storing processing unit 132 stores the positions of the detection points updated by the position update unit 131 in the non-volatile memory 142 when the subject vehicle is in the parking state. The positions of detections points is also referred to as a position cluster of the detection points. In the parking state, the storing processing unit 132 stores the detection point management data currently stored in the volatile memory 141 in the non-volatile memory 142. The detection point management data stored in the non-volatile memory 142 is not erased even when the power switch of the subject vehicle is turned off.

When multiple detection points can be regarded as detection results for the same obstacle, the grouping processing unit 133 performs a grouping process for managing the multiple detection points as one set (hereinafter referred to as a group) by associating the detection points with one another. For example, when a distance between two adjacent detection points is shorter than a predetermined distance for distinguishing whether the detection points belong to the same obstacle, the two adjacent detection points may be determined as the detection points corresponding to the same obstacle. In a point group in which multiple detection points are arranged in chronological order, detection points corresponding to a part that can be approximated by a function of an ellipse or a parabola may be set as the detection points corresponding to the same obstacle.

The grouping processing unit 133 may be configured to perform the grouping process on the detection points stored in the volatile memory 141, or may be configured to perform the grouping process on the detection points stored in the non-volatile memory 142. In a case where the detection points stored in the volatile memory 141 are grouped by the grouping processing unit, the storing processing unit 132 may also store, in the non-volatile memory, the information about the grouping process executed in the volatile memory in the parking state of the subject vehicle. In a case where the detection points stored in the non-volatile memory 142 are grouped by the grouping processing unit, the grouping processing unit 133 may execute the grouping process to the detection points stored in the non-volatile memory 142 when the vehicle starts moving from the parked state. The parked state is a stop state after the vehicle completes the parking.

In a case where the detection points stored in the volatile memory 141 are grouped by the grouping processing unit, as described above, the information about the grouping process is also stored in the non-volatile memory 142. This may cause an increase of processing load of writing operation. In the parking state of the subject vehicle, when the duration required for the writing operation increases in response to the increase of processing load of writing operation, a power consumption of the subject vehicle in the parking state may increase. Thus, instead of grouping the detection points stored in the volatile memory, the detection points stored in the non-volatile memory 142 may be grouped by the grouping processing unit.

When the detection result management unit 13 can specify a contour shape of the detected obstacle from the point group including the grouped detection points, a region forming the contour shape may be regarded as a region where the obstacle exists. Alternatively, a region positioned behind the specified contour shape when viewed from the subject vehicle may be regarded as the region where the obstacle exists. The contour shape of the obstacle may be represented by a linear approximation curve calculated with multiple detection points for the same obstacle as a population. The contour shape of the obstacle may be represented by connecting multiple detection points corresponding to the same obstacle in chronological order.

When the subject vehicle starts moving from the parked state, the position estimation unit 15 estimates a position of the detection point existing in the blind spot (hereinafter referred to as a blind spot between two adjacent detection ranges) between the detection range of the first sonar 21 and the detection range of the second sonar 22 using the positions of the detection points, which are stored by the storing processing unit 132 in the non-volatile memory 142. Since the detection point existing in the blind spot between the adjacent detection ranges of the first sonar 21 and the second sonar 22, both of the first and second sonars 21, 22 fail to detect the detection point. For example, the position estimation unit 15 may specify the start of subject vehicle by detecting turn-on of the power switch. As another example, the position estimation unit 15 may specify the start of subject vehicle in response to the shift position sensor of the vehicle state sensor(s) 30 detecting the shift position change to a drive position or a rear position from a parking position. Alternatively, the position estimation unit 15 may specify the start of subject vehicle in response to a turn-off signal of the parking brake switch of the vehicle state sensor(s) 30.

For the positions of detection points divided into the same group by the grouping processing unit 133 and stored by the storing processing unit 132 in the non-volatile memory 142, the position estimation unit 15 determines whether the stored detection points can be detected by multiple periphery monitoring sensors 20 at the time of starting the subject vehicle. In the present embodiment, the first sonar 21 and the second sonar 22 determine whether the detection points can be detected. When the detection points can be detected by the first sonar 21, the positions of the detection points can be specified by the first position specifying unit 101. When the detection points can be detected by the second sonar 22, the positions of the detection points can be specified by the second position specifying unit 102. The positions of the detection points, which are divided into the same group by the grouping processing unit 133 and stored in the non-volatile memory 142 by the storing processing unit 132, corresponds to a position group of the detection points corresponding to the same obstacle. For example, the position estimation unit 15 compares the positions of the detection points, which are stored in the non-volatile memory 142 by the storing processing unit 132, with the detection range, which is indicated by the detection range information stored in advance in the non-volatile memory 142, and determines whether a part of the positions of detection points are included in the detection range. In this way, the position estimation unit 15 determines whether the stored detection points can be detected by the periphery monitoring sensor.

Figure 3:
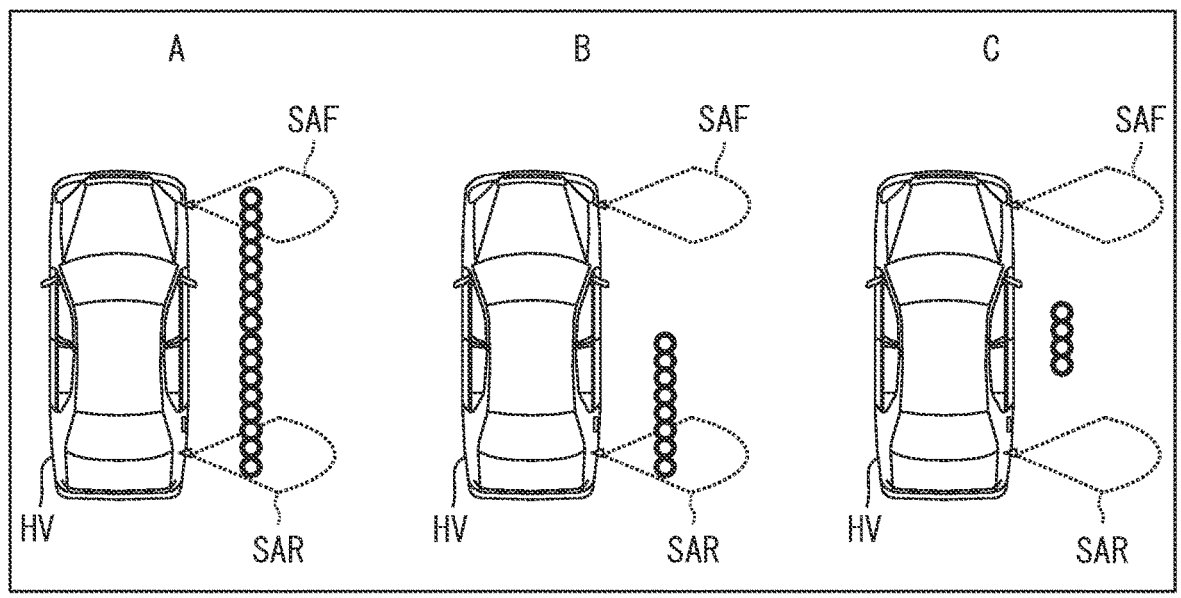
FIG. 3 is a diagram showing a determination example which determines whether a position group including multiple detection points of the same obstacle can be detected by a first sonar and a second sonar.

FIG. 3 shows a determination example which determines whether the positions of detection points corresponding to the same obstacle can be detected by the first sonar 21 and the second sonar 22. The circles in FIG. 3 represent the detection points stored in the non-volatile memory 142 by the storing processing unit 132. As shown in A of FIG. 3, when the positions of the detection points stored in the non-volatile memory 142 by the storing processing unit 132 are included in both of the detection range SAF of the first sonar 21 and the detection range SAR of the second sonar 22, the position estimation unit determines that the corresponding detection points can be detected by both of two sonars. As shown in B of FIG. 3, when the positions of the detection points stored in the non-volatile memory 142 by the storing processing unit 132 is only included in the detection range SAF of the first sonar 21 or only include in the detection range SAR of the second sonar 22, the position estimation unit determines that the corresponding detection points can be detected by only one sonar. As shown in C of FIG. 3, when the positions of the detection points stored in the non-volatile memory 142 by the storing processing unit 132 are not included in both of the detection range SAF of the first sonar 21 and the detection range SAR of the second sonar 22, the position estimation unit determines that the corresponding detection points cannot be detected by any sonar.

When the position estimation unit 15 determines that the positions of the detection points corresponding to the same obstacle can be detected by both sonars (as shown in D of FIG. 4 and G of FIG. 5), the following operation is carried out. The position estimation unit 15 controls the first sonar 21 and the second sonar 22 to perform sensing operation for multiple times. In the actual sensing operation, when the detection point is actually detected at the same detection distance as the detection point determined to be detectable by each sonar (see E of FIG. 4, dot-patterned circle), the position of undetectable detection point existing in the blind spot between the detection ranges of two sonars is estimated based on the position of the detection point stored in the non-volatile memory 142 (see F of FIG. 4, white circle). Herein, a circle with dot pattern is referred to as a dot-patterned circle. The same applies to the following description. In the multiple time sensing operations, when the detection point is detected by a certain number of times or more at a distance same as the distance of detection point determined to be detectable by the sonar, the detection point may be determined to be actually detected. The same applies to the following description. The same distance described here may indicate substantially same distance including an allowable error. The same applies to the following description.

For the positions of the detection points corresponding to the same obstacle, when a detection point, which is determined to be the same as the detection point detected by the corresponding sonar, is actually detected at the start time of vehicle, for a detection point that cannot be detected by either one of the two sonars at the start time of vehicle, the position estimation unit 15 sets the corresponding position stored in the non-volatile memory 142 as the estimated position of the detection point existing in the blind spot.

Figure 4:
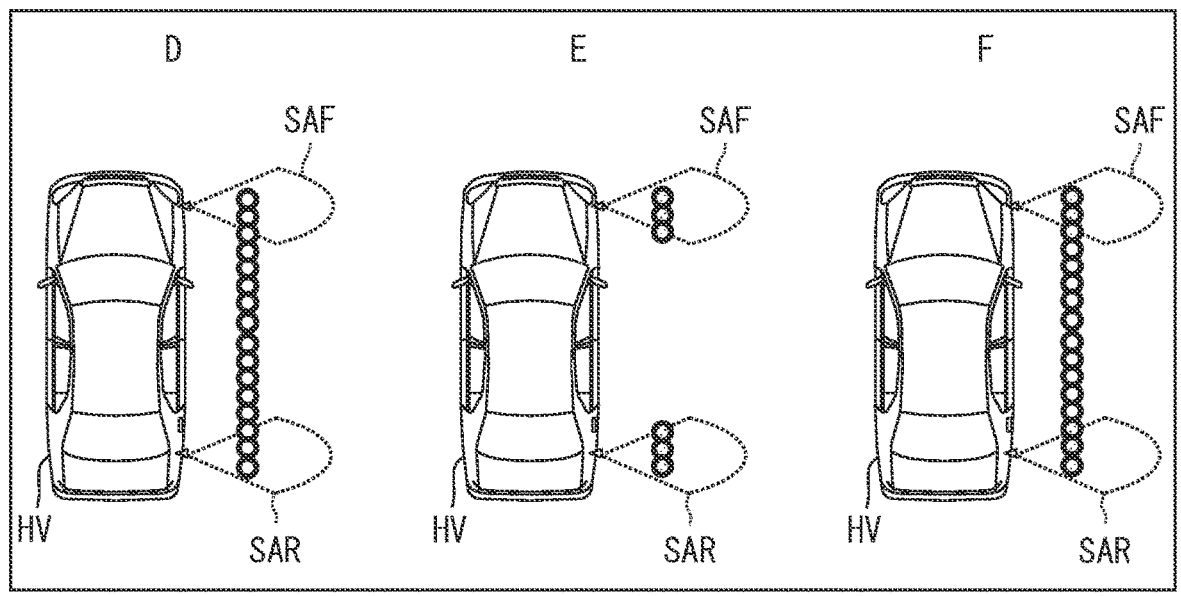
FIG. 4 is a diagram showing an example of an estimation method that estimates a position of a detection point in a blind spot existing between respective detection ranges of the first sonar and the second sonar at a vehicle start time.

In the example shown in FIG. 4, the position estimation unit 15 may read out the estimated position of the detection point from the non-volatile memory 142 and write it in the volatile memory 141 as the position of the detection point. The positions of the detection points actually detected by the first sonar 21 or the second sonar 22 may be written in the volatile memory 141 by the storing processing unit 132.

Figure 5:
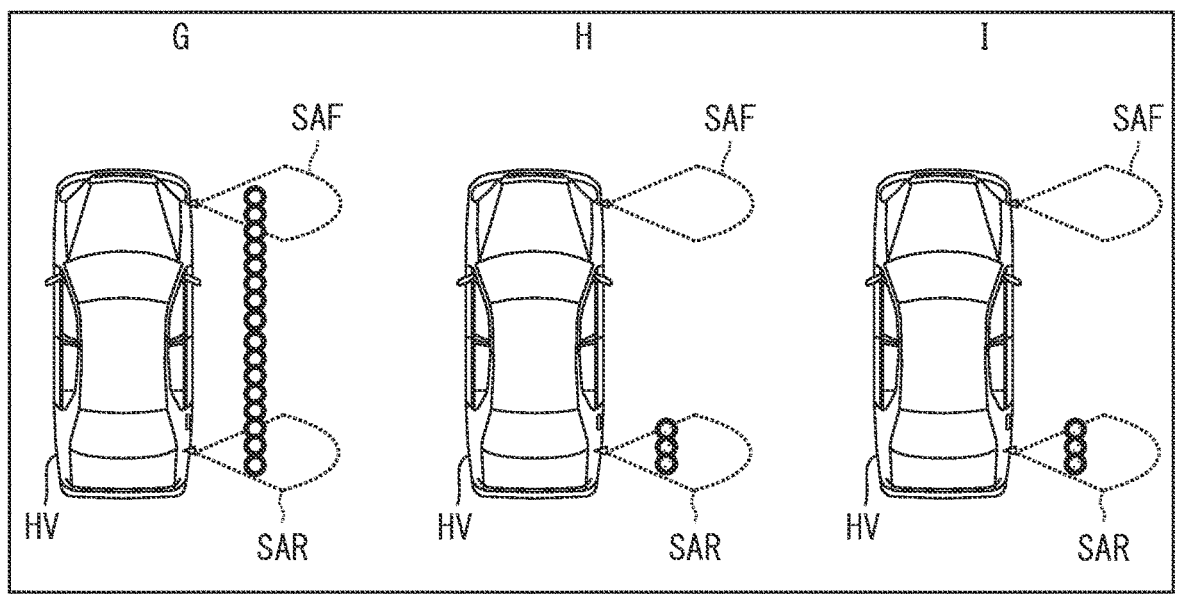
FIG. 5 is a diagram showing an example of an estimation method that estimates a position of a detection point in a blind spot existing between respective detection ranges of the first sonar and the second sonar at a vehicle start time.

When the detection point is detected only by the second sonar 22 in the actual sensing at the same distance as the detection point determined to be detectable by the second sonar (see H of FIG. 5, dot-patterned circle), the position of detection point existing in the blind spot between the two adjacent detection ranges is not estimated based on the position of the detection point stored in the non-volatile memory 142 (see I of FIG. 5).

For the positions of the detection points corresponding to the same obstacle, when a detection point determined to be the same as the stored detection point based on the position is actually detected by only one sonar at the start time of vehicle, the position estimation unit 15 does not set, for a detection point that cannot be detected by both of the two sonars at the start time of vehicle, the corresponding position stored in the non-volatile memory 142 as the estimated position of this detection point.

In the example shown in FIG. 5, the position of the detection point existing in the blind spot, which is stored in the non-volatile memory 142, is not written in the volatile memory 141, and the position of the detection point actually detected by the second sonar 22 is written to the volatile memory 141 by the storing processing unit 132.

According to the above configuration, at the start time of vehicle, when one of the detection points corresponding to the same obstacle can be actually detected by the first sonar, another one of detection points corresponding to the same obstacle can be actually detected by the second sonar, and a detection point existing in the blind spot and determined to be the same as the detection point included in the position group cannot be actually detected by both sonars, the position of the detection point existing in the blind spot between the two adjacent detection ranges is estimated based on the position of the detection point stored in the non-volatile memory 142. When the positions of the detection points corresponding to the same obstacle are detected by both sonars at the start time of vehicle, the position of the detection point existing in the blind spot between the two adjacent detection ranges is set using the corresponding position stored in the non-volatile memory 142 since the reliability of the stored position is estimated to be high in this case. Thus, only when the reliability of stored position is estimated to be high, the position of the detection point existing in the blind spot between the detection ranges is estimated based on the position of the detection point stored in the non-volatile memory 142. This configuration can improve the position estimation accuracy of detection point.

When the detection point, which is located at the same detection distance as the detection point determined to be detectable by corresponding sonar, is detected by only one sonar in the actual sensing, the position estimation unit 15 may restore only the position of detection point actually detected by the one sonar. For example, the storing processing unit 132 may write only the position of detection point actually detected by the sonar in the volatile memory 141. There exists a difference between an end time of multiple sensing operations executed by the first sonar 21 and an end time of multiple sensing operations executed by the second sonar 22. Thus, whether the detection point is detected by only one sensor can be clearly determined based on the end time of each sonar in the actual sensing.

When a detection point at the same detection distance as the detection point determined to be detectable is firstly detected by one sonar and a detection point at the same detection distance as the detection point determined to be detectable is detected by the other sonar at a later time, positions of the detection points detected by the two sonars and position of a detection point existing in the blind spot between the two adjacent detection ranges may be restored by the position estimation unit 15 at the later time when the detection point is detected by the other sonar. That is, the storing processing unit 132 writes, in the volatile memory 141, the position of the detection point detected by the other sonar in the volatile memory 141, and writes the position of detection point existing in the blind spot between the detection ranges with the position stored in the non-volatile memory 142. The position of the detection point existing in the blind spot is stored by the storing processing unit 132 in the past.

For the positions of the detection points corresponding to the same obstacle, when a detection point, which is determined to be detectable by the position estimation unit and located at the same distance as the detection point included in the same position group, is actually not detected by the corresponding sonar at the start time of vehicle, the position estimation unit 15 does not set, for a detection point that cannot be detected by both of the two sonars at the start time of vehicle, the position stored in the non-volatile memory 142 as estimated position of this detection point. In this case, only the position of the detection point actually detected by the first sonar 21 or the second sonar 22 may be written in the volatile memory 141 by the storing processing unit 132.

Figure 6:
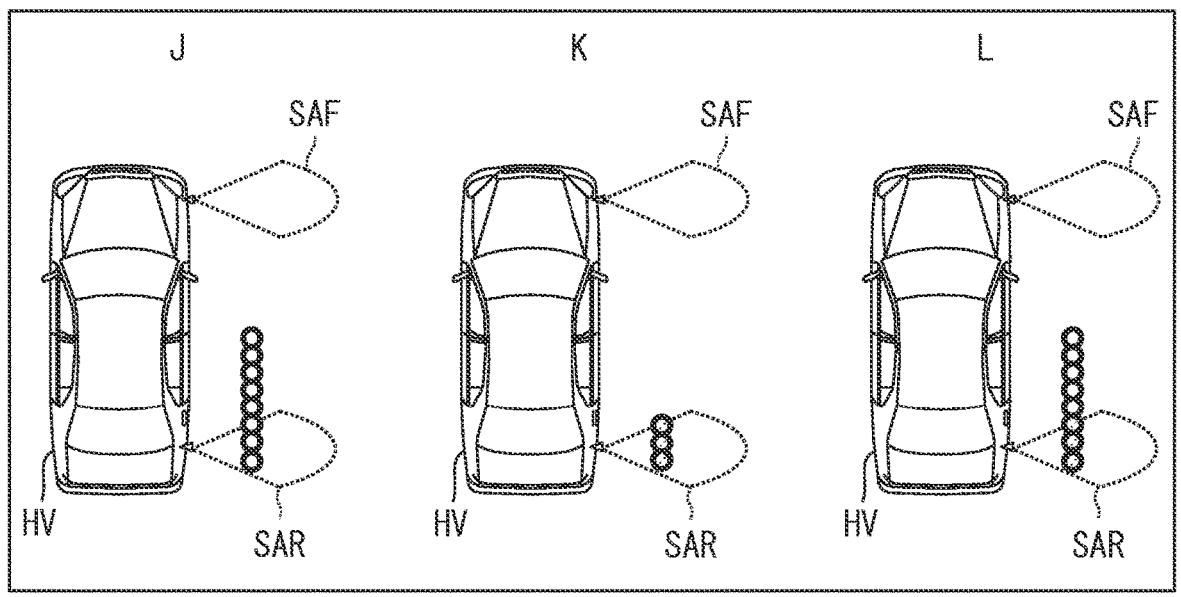
FIG. 6 is a diagram showing an example of an estimation method that estimates a position of a detection point in a blind spot existing between respective detection ranges of the first sonar and the second sonar at a vehicle start time.
Figure 7:
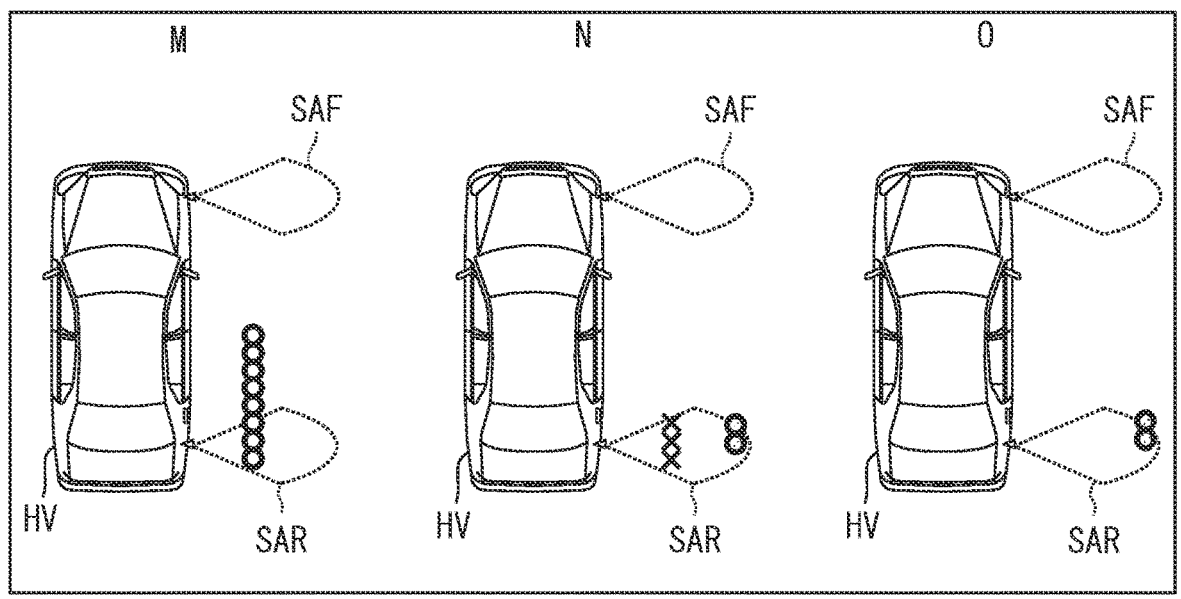
FIG. 7 is a diagram showing an example of an estimation method that estimates a position of a detection point in a blind spot existing between respective detection ranges of the first sonar and the second sonar at a vehicle start time.

The following will describe an example where the position estimation unit 15 determines that the positions of the detection points corresponding to the same obstacle can be detected by only one sonar (see J of FIG. 6 and M of FIG. 7). Specifically, an example in which the detection point is detectable only by the second sonar 22 will be described. The position estimation unit 15 controls the second sonar 22 to perform sensing operation for multiple times. In the actual sensing operation, when the detection point is actually detected at the same detection distance as the detection point determined to be detectable by the second sonar 22 (see K of FIG. 6, dot-patterned circle), the position of undetectable detection point existing in the blind spot between the detection ranges of two sonars is estimated based on the position of the detection point stored in the non-volatile memory 142 (see L of FIG. 6, white circle).

For the positions of the detection points corresponding to the same obstacle, when a detection point, which has been detected by the second sonar 22 and is determined to be the same as the detection point included in the position group, is actually detected by the second sonar 22 at the start time of vehicle, for a detection point that cannot be detected by either one of the two sonars at the start time of vehicle, the position of this detection point stored in the non-volatile memory 142 is estimated by the position estimation unit 15 to be the actual position of the detection point.

In the example shown in FIG. 6, the position estimation unit 15 may read out the estimated position of the blind detection point from the non-volatile memory 142 and write it in the volatile memory 141 as the position of the blind detection point. The position of the detection point actually detected by the second sonar 22 may be written in the volatile memory 141 by the storing processing unit 132.

When the detection point is not detected by the second sonar 22 in the actual sensing at the same distance as the detection point determined to be detectable by the second sonar 22 (see N of FIG. 7, cross marks and dot-patterned circles), the position of detection point existing in the blind spot between the two adjacent detection ranges is not estimated based on the position of the detection point stored in the non-volatile memory 142 (see O of FIG. 7). In FIG. 7, the detection point is detected by the second sonar 22 at a position (see dot-patterned circles in N of FIG. 7) different from the position (see cross marks in N of FIG. 7) of the detection point determined to be detectable by the second sonar 22. When the detection point is completely not detected by the second sonar 22 or is detected at a different position, the position of the detection point existing in the blind spot between the detection ranges is not estimated based on the position of the detection point stored in the non-volatile memory 142.

For the positions of the detection points corresponding to the same obstacle, when a detection point, which has been detected by the second sonar 22 and is determined to be the same as the detection point included in the position group, is actually not detected by the second sonar 22 at the start time of vehicle, for a detection point that cannot be detected by either one of the two sonars at the start time of vehicle, the position of this detection point stored in the non-volatile memory 142 is not estimated by the position estimation unit 15 to be the actual position of the detection point.

In the example shown in FIG. 7, the position of the detection point existing in the blind spot, which is stored in the non-volatile memory 142, is not written in the volatile memory 141, and the position of the detection point actually detected by the second sonar 22 is written to the volatile memory 141 by the storing processing unit 132.

Figure 8:
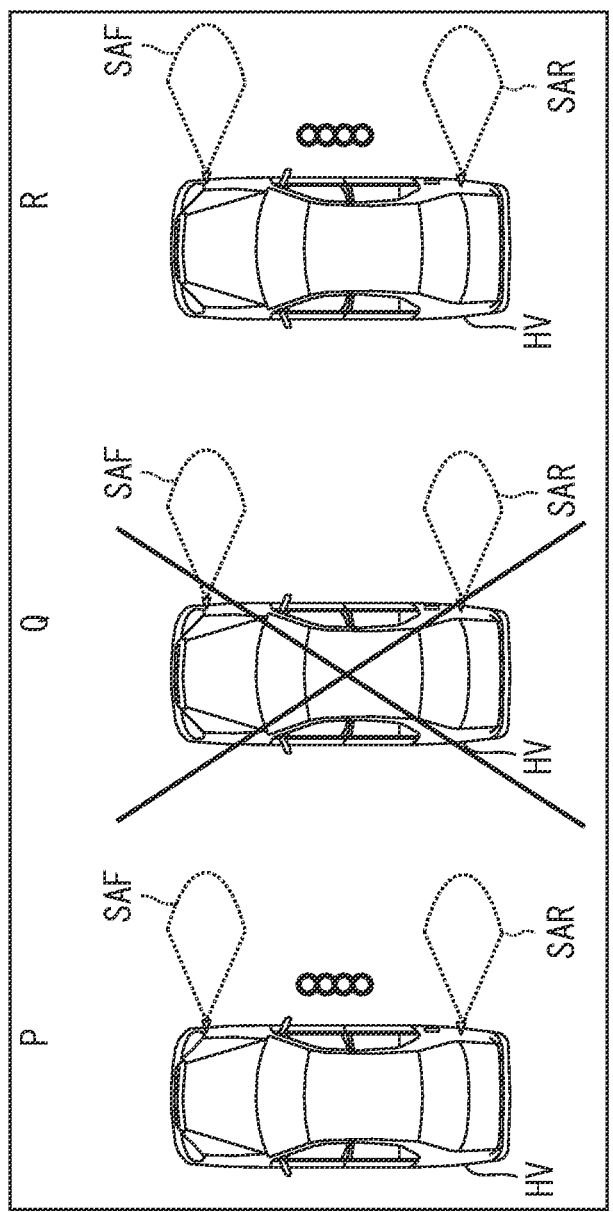
FIG. 8 is a diagram showing an example of an estimation method that estimates a position of a detection point in a blind spot existing between respective detection ranges of the first sonar and the second sonar at a vehicle start time.

When the position estimation unit 15 determines that the positions of the detection points corresponding to the same obstacle cannot be detected by both sonars (as shown in P of FIG. 8), the following operation is carried out. The position estimation unit 15 deactivates the multiple sensing operations of the first sonar 21 and the second sonar 22 (see Q of FIG. 8), and the position of detection point, which exists in the blind spot between the detection ranges and cannot be detected by both sonars, is estimated from the position of the detection point stored in the non-volatile memory 142 (see R of FIG. 8, white circles).

For the positions of detection points corresponding to the same obstacle, when a detection point included in the position group is not included in both detection ranges of both sonars at the start time of vehicle, the position estimation unit 15 sets the corresponding position stored in the non-volatile memory 142 as the estimated position of detection point that cannot be detected by both sonars at the start time of vehicle.

When the positions of the detection points corresponding to the same obstacle cannot be detected by both sonars at the start time of vehicle, the position estimation unit 15 determines whether a distance between the detection point included in the position group to the subject vehicle is equal to or longer than a predetermined distance. When determining that the distance being equal to or longer than the predetermined distance, the position estimation unit 15 may be configured to not set the position stored in the non-volatile memory 142 as the estimated position of the detection point. This is because, for a detection point that is located far away and less urgent to be avoided, the position estimation accuracy may be considered with higher priority by avoiding estimation of wrong position. The predetermined distance referred to here is a distance for classifying the urgency levels of avoiding proximity, and may be set as, for example, 50 cm.

When the positions of the detection points corresponding to the same obstacle cannot be detected by both sonars at the start time of vehicle and the distance from the detection point to the subject vehicle is less than the predetermined distance, the position estimation unit 15 sets the positions stored in the non-volatile memory 142 as estimated position of the detection point. This is because, for a detection point that is located close to the subject vehicle and highly urgent to be avoided, the safety may be considered with higher priority than the position estimation accuracy. The distance from the subject vehicle to the detection point may be the distance from the outer surface of the subject vehicle to the detection point, which is the closest to one another. The position of the outer surface with respect to the reference point of the subject vehicle may be specified from, for example, the vehicle body shape information of the subject vehicle stored in the non-volatile memory 142.

The route specifying unit 16 specifies a route of the subject vehicle. The route of the subject vehicle may be a predicted route of the reference point of the subject vehicle, and is specified from the steering angle of the subject vehicle detected by the steering angle sensor and the vehicle speed of the subject vehicle detected by the vehicle speed sensor. The steering angle sensor and the vehicle speed sensor are included in the vehicle state sensor(s) 30. The route of the subject vehicle may be a direction with respect to the reference point of the subject vehicle indicated by the steering angle of the subject vehicle. Herein, the steering angle of the subject vehicle is detected by the steering angle sensor, which is included in the vehicle state sensor(s) 30.

The avoidance determination unit 17 sequentially determines a necessity of avoiding obstacle (hereinafter referred to as target obstacle) whose detection points are managed by the detection result management unit 13 according to the specified route of the subject vehicle. As described above, the route of subject vehicle is specified by the route specifying unit 16. As an example, it is necessary to avoid the target obstacle when the position of the detection point stored in the volatile memory 141 is included in the travelling area of the subject vehicle estimated based on the specified route of subject vehicle. As described above, the route of subject vehicle is specified by the route specifying unit 16. The travelling area is an area that the subject vehicle necessarily travels through when the subject vehicle travels along the specified route. When the position of the detection point stored in the volatile memory 141 is not included in the travelling area, the avoidance determination unit may determine that avoidance of the target obstacle is not necessary. The avoidance determination unit 17 may estimate the travelling area of the subject vehicle based on the specified route of the subject vehicle and the vehicle width information of the subject vehicle. As described above, the vehicle width information may be included in the vehicle body shape information. A width of the travelling area may be set as a width of the subject vehicle with a margin.

The avoidance determination unit 17 may determine the necessity of avoiding the obstacle with consideration of TTC (time to collision) of obstacle, a distance to the obstacle, and the like in addition to the specified route of the subject vehicle. This is to avoid erroneous determination such that it is necessary to avoid the obstacle which is unlikely to be in close proximity. The TTC of obstacle may be calculated from an obstacle distance and the vehicle speed of the subject vehicle detected by the vehicle speed sensor. The vehicle speed sensor is included in the vehicle state sensor(s) 30.

The obstacle distance may be the shortest distance from the outer surface of the subject vehicle to the detection points of obstacle among multiple detected distances. The obstacle distance may be the distance between the reference point of the subject vehicle and the detection point of the obstacle, which is the closest among multiple distances from the reference point of the subject vehicle to multiple detection points of the obstacle. The obstacle distance may be the distance between an installation position of the periphery monitoring sensor 20 of the subject vehicle and the detection point of the obstacle, which is the closest among multiple distances from the installation position of the periphery monitoring sensor 20 to the multiple detections points of the obstacle.

The avoidance determination unit 17 may determine that avoidance of the obstacle is necessary in a case where the position of the detection point of obstacle stored in the volatile memory 141 is included in the travelling area of the subject vehicle and the TTC of the obstacle is less than a threshold value set for TTC. When any one of the two conditions is not satisfied, the avoidance determination unit may determine that avoidance of obstacles is not necessary. The threshold value set for TTC referred to here is a value for determining whether it is possible to avoid the obstacle with a margin, and can be properly set as necessary.

The avoidance determination unit 17 may determine that avoidance of the obstacle is necessary in a case where the position of the detection point of the obstacle stored in the volatile memory 141 is included in the travelling area of the subject vehicle and the obstacle distance is shorter than an avoidance distance. When any one of the two conditions is not satisfied, the avoidance determination unit may determine that avoidance of obstacles is not necessary. The avoidance distance referred to here is a value for determining whether the obstacle can be avoided with a margin, and can be properly set as necessary. The avoidance distance may be set to increase with an increase of the vehicle speed of the subject vehicle.

The alert processing unit 18 controls the alert device 40 to issue an alert when the avoidance determination unit 17 determines that avoidance of obstacle is necessary. When the avoidance determination unit 17 determines that the avoidance of obstacles is not necessary, the alert processing unit 18 does not issue an alert with the alert device 40.

(Periphery Monitoring Related Process Executed by Periphery Monitoring ECU 10)

Figure 9:
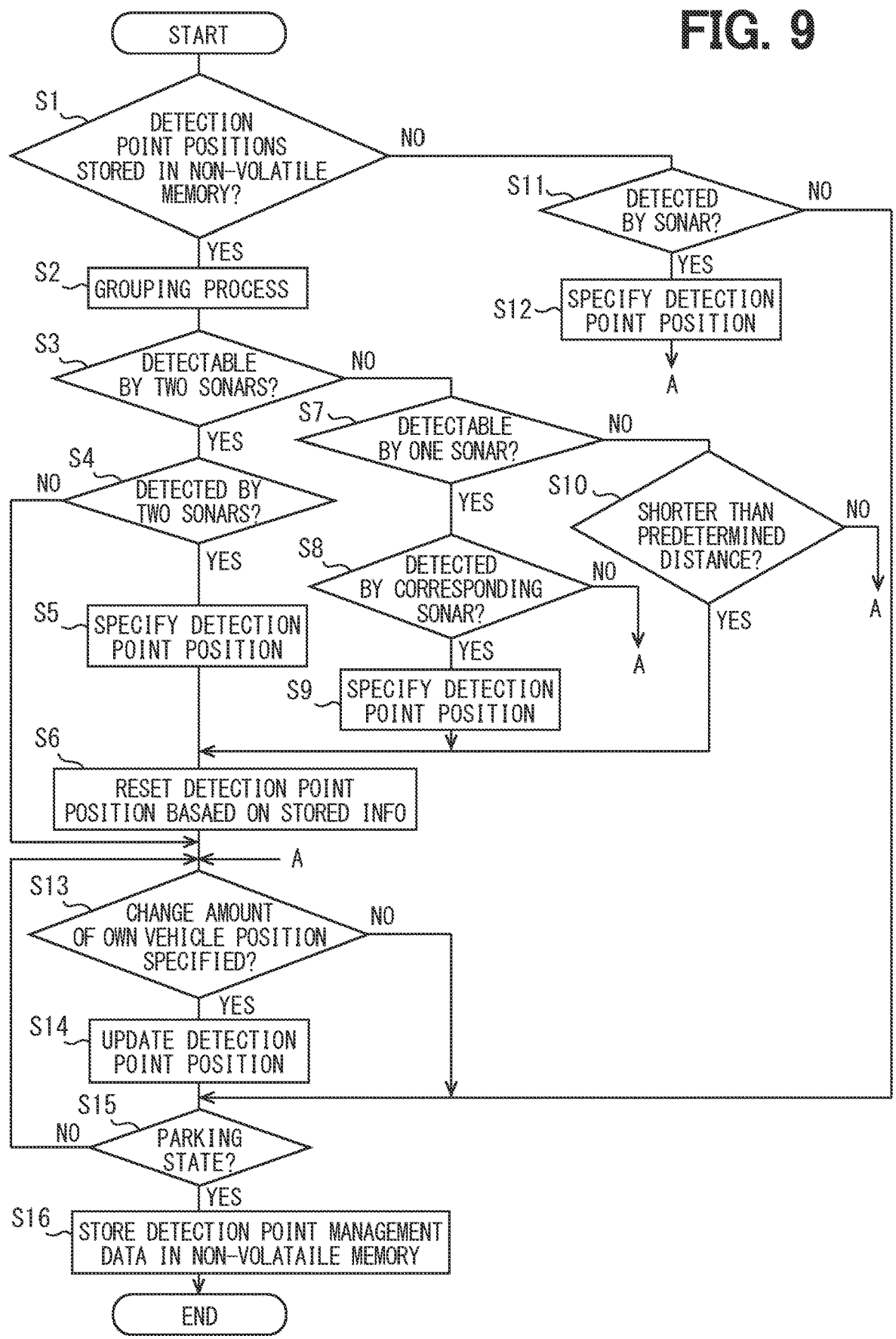
FIG. 9 is a flowchart showing an example of a periphery monitoring related process executed by a periphery monitoring ECU.

The following will describe an example of periphery monitoring related process executed by the periphery monitoring ECU 10 with reference to the flowchart shown in FIG. 9. The execution of each step included in the periphery monitoring related process by the computer corresponds to the execution of vehicle periphery monitoring method. The flowchart of FIG. 9 may be configured to start when the subject vehicle starts moving from the parked state in response to turning on of the power switch of subject vehicle. In the example of FIG. 9, it is assumed that sensing operations of the first sonar 21 and the second sonar 22 are successively and repeatedly performed after the start of the periphery monitoring related process.

In S1, when the periphery monitoring ECU determines that the positions of detection points is stored in the non-volatile memory 142 (YES in S1), the process proceeds to S2. The positions of the detection points are updated by the position update unit 131 at the time of previous parking, and then the storing processing unit 132 stores the updated positions of detection points in the non-volatile memory 142. When no position of the detection point is stored in the non-volatile memory 142 (NO in S1), the process proceeds to S11.

In S2, the grouping processing unit 133 performs grouping process to the positions of detection points stored in the non-volatile memory 142 for classifying the detection points corresponding to the same obstacle in the same group. In S3, the position estimation unit 15 determines whether the positions of the detection points classified in the same group in S2 can be detected by both of the first sonar 21 and the second sonar 22. When determining that the positions of detection points classified in the same group can be detected by both sonars (YES in S3), the process proceeds to S4. When determining that the positions of detection points classified in the same group cannot be detected by both sonars (NO in S3), the process proceeds to S7.

In S4, the position estimation unit 15 controls the first sonar 21 and the second sonar 22 to perform multiple times of sensing operation. In the actual sensing operation, when the detection point, which is located at the same distances as the detection point determined to be detectable by the first sonar in S3, is detected by the first sonar and the detection point, which is located at the same distance as the detection point determined to be detectable by the second sonar in S3, is detected by the second sonar (YES in S4), the process proceeds to S5. In the actual sensing operation, when the detection point, which is located at the same distances as the detection point determined to be detectable by the first sonar in S3, is not detected by the first sonar and the detection point, which is located at the same distance as the detection point determined to be detectable by the second sonar in S3, is not detected by the second sonar (NO in S4), the process proceeds to S13. In S4, when the detection point, which is located at the same distance as the detection point determined to be detectable by only one sonar in S3, is not detected by the corresponding sonar, the first position specifying unit 101 or the second position specifying unit 102 specifies the position of the detection point. Then, the storing processing unit 132 stores the specified position of detection point in the volatile memory 141.

In S5, with respect to the detection points detected in S4, the position of the detection point detected by the first sonar 21 is specified by the first position specifying unit 101. The position of the detection point detected by the second sonar 22 is specified by the second position specifying unit 102. Then, the storing processing unit 132 stores the specified positions of detection points in the volatile memory 141, and the process proceeds to S6.

In S6, the position estimation unit 15 sets the corresponding position stored in the non-volatile memory 142 as estimated position of the detection point, which exists in the blind spot between the detection ranges and cannot be detected by both sonars. Then, the estimated position of the detection point existing in the blind spot is read out from the non-volatile memory 142, and then written in the volatile memory 141 as the position of the detection point existing in the blind spot. Then, the process proceeds to S13. That is, the position of the detection point existing in the blind spot between the detection ranges is restored from the storage of the non-volatile memory 142, and the process proceeds to S13.

In S7, when the positions of the detection points classified into the same group in S2 can be detected by only one sonar, that is, only the first sonar 21 or only the second sonar 22 (YES in S7), the process proceeds to S8. When the positions of detection points classified into the same group cannot be detected by neither sonars (NO in S7), the process proceeds to S10.

In S8, the position estimation unit 15 controls the first sonar 21 and the second sonar 22 to perform multiple times of sensing operation. In the actual sensing operation, when the detection point, which is located at the same distances as the detection point determined to be detectable by the first sonar in S3, is detected only by the first sonar or the detection point, which is located at the same distance as the detection point determined to be detectable by the second sonar in S3, is detected only by the second sonar (YES in S8), the process proceeds to S9. In the actual sensing operation, when the detection point, which is located at the same distances as the detection point determined to be detectable by the first sonar in S3, is not detected by the first sonar or the detection point, which is located at the same distance as the detection point determined to be detectable by the second sonar in S3, is not detected by the second sonar (NO in S8), the process proceeds to S13. When the detection point, which is located at the same distance as the detection point determined to be detectable by only one sonar in S3, is not detected by the corresponding sonar but the detection point, which is located at a different distance from the detection point determined to be detectable by one sonar in S3, is detected by the corresponding sonar, the first position specifying unit 101 or the second position specifying unit 102 specifies the position of the actually detected detection point. Then, the storing processing unit 132 stores the specified position of detection point in the volatile memory 141.

In S9, with respect to the detection point detected in S8, the position of the detection point detected by the first sonar 21 is specified by the first position specifying unit 101. The position of the detection point detected by the second sonar 22 is specified by the second position specifying unit 102. Then, the storing processing unit 132 stores the specified positions of detection points in the volatile memory 141, and the process proceeds to S6.

In S10, the position estimation unit 15 specifies the actual distance from the detection point, which is located in the blind spot between the detection ranges and corresponds to the detection point stored in the non-volatile memory 142, to the subject vehicle. When the distance is shorter than the predetermined distance (YES in S10), the process proceeds to S6. When the distance is equal to or longer than the predetermined distance (NO in S10), the process proceeds to S13.

In S11, the first sonar 21 and the second sonar 22 are controlled to perform sensing operations by multiple times. When the detection point is detected by at least one sonar in the actual sensing operation (YES in S11), the process proceeds to S12. When the detection point is not detected by any one of the sonars (NO in S11), the process proceeds to S15.

In S12, with respect to the detection point detected in S11, the position of the detection point detected by the first sonar 21 is specified by the first position specifying unit 101. The position of the detection point detected by the second sonar 22 is specified by the second position specifying unit 102. Then, the storing processing unit 132 stores the specified positions of detection points in the volatile memory 141, and the process proceeds to S13.

In S13, when the change amount specifying unit 12 specifies the position change amount of subject vehicle (YES in S13), the process proceeds to S14. When the change amount specifying unit 12 specifies no position change of subject vehicle (NO in S13), the process proceeds to S15.

In S14, for the positions of the detection points stored as the detection point management data in the volatile memory 141, the position update unit 131 changes the positions of the detection points corresponding to the position change amount specified in S13, thereby updating the positions of detection points in the XY coordinate system.

In S15, when the detection result management unit 13 specifies the parking state of subject vehicle (YES in S15), the process proceeds to S16. In S15, when the detection result management unit 13 determines that the subject vehicle is not in the parking state (NO in S15), the process returns to S13 and repeats the process.

In S16, the storing processing unit 132 stores the detection point management data, which is currently stored in the volatile memory 141, in the non-volatile memory 142, and ends the periphery monitoring related process. The detection point management data stored in the non-volatile memory 142 may be erased by overwriting new data on the old data when new detection point management data is stored at the next time parking.

Brief of First Embodiment

According to the configuration of the first embodiment, an obstacle, which exists in the blind spot between detection ranges and cannot detected by the first sonar 21 and the second sonar 22 at the start time of subject vehicle, can be estimated by the position estimation unit 15. Thus, when an obstacle is located in the blind spot between the detection ranges, the avoidance determination unit 17 can determine the necessity of avoidance based on the position of the detection point, which is estimated by the position estimation unit 15. Thus, even when the obstacle is located in the blind spot between the detection ranges, the alert device 40 can notify an alert in response to avoidance of the obstacle being determined to be necessary. As a result, when multiple periphery monitoring sensors 20 are used to monitor the periphery of the vehicle, the parked vehicle is started with improved position detection accuracy of the obstacle using the periphery monitoring sensors 20. Thus, the configuration in first embodiment enables an avoidance of the proximity of subject vehicle to the obstacle existing in the blind spot between the detection ranges of the periphery monitoring sensors 20 in the horizontal direction.

Figure 10:
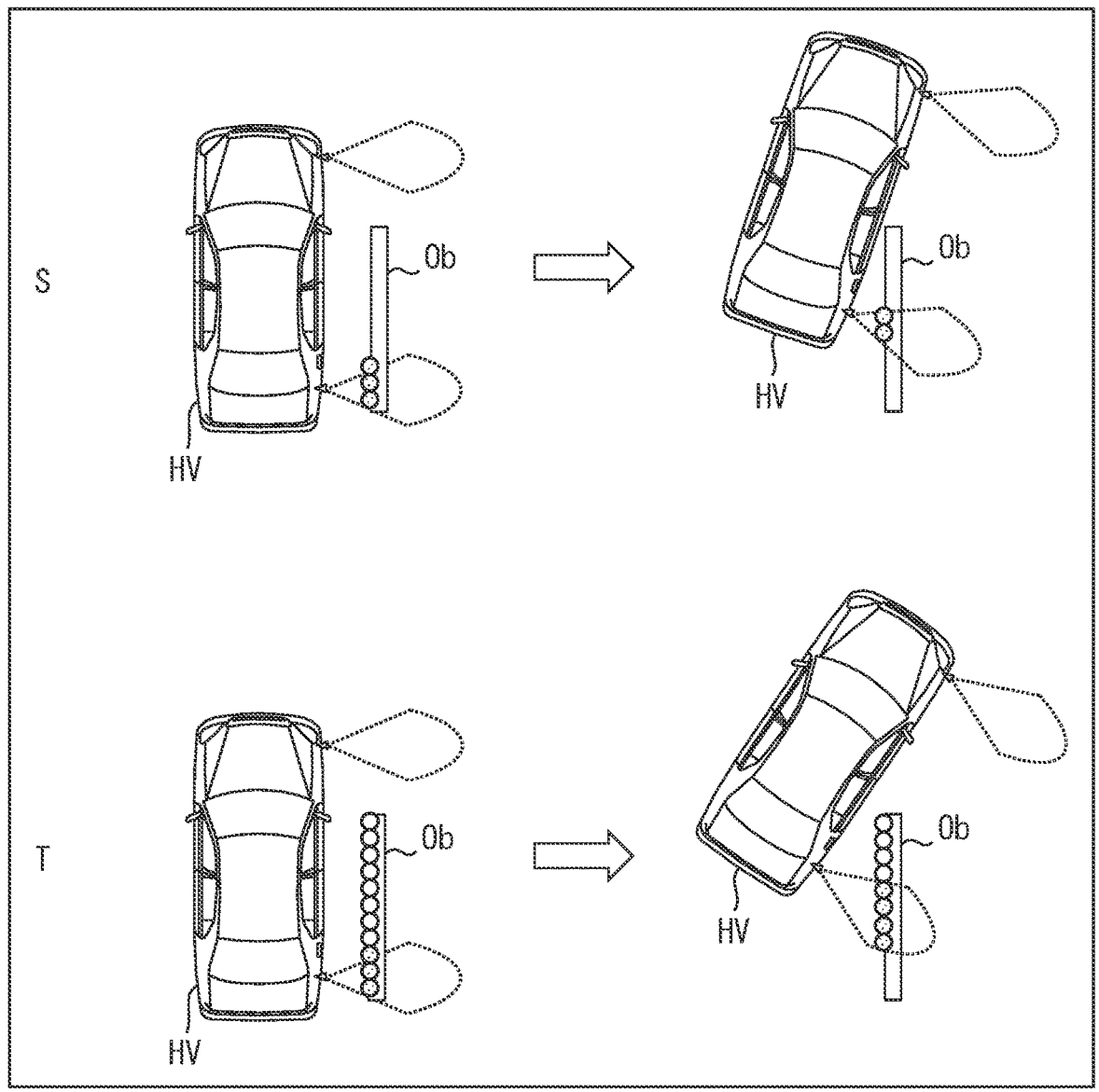
FIG. 10 is a diagram showing a technical effect provided a configuration described in the first embodiment.

The following will describe technical effects of the configuration described in the first embodiment with reference to FIG. 10. In FIG. 10, the symbol S indicates a comparative example of prior art, and the symbol T indicates an example described in the first embodiment of the present disclosure. The symbol Ob in FIG. 10 indicates an obstacle. The dot-patterned circles in FIG. 10 indicate the detection points of the obstacle Ob actually detected by the periphery monitoring sensor 20 when the subject vehicle HV starts moving. The white circles in FIG. 10 indicate the detection points having positions estimated by the position estimation unit 15 of the first embodiment when the subject vehicle HV starts moving.

In the prior art, the position of the detection point detected by the periphery monitoring sensor 20 before the parking completion of the subject vehicle HV is stored only in the volatile memory 141. Thus, the position is erased from the volatile memory 141 after the vehicle is parked and the power switch is turned off. Therefore, when the vehicle HV starts moving from the parked state, only the position of the detection point, which is actually detected by the periphery monitoring sensor 20, is recognized. Thus, it becomes difficult to support the vehicle HV so that the vehicle HV avoids the proximity to the obstacle existing in the blind spot between the detection ranges of the periphery monitoring sensors 20 in the horizontal direction (see S of FIG. 10).

According to the configuration of the first embodiment, an obstacle located in the blind spot between the detection ranges can be estimated by the position estimation unit 15. Thus, it becomes easy to support the vehicle HV so that the vehicle avoids the proximity to the obstacle existing in the blind spot between the detection ranges (see T of FIG. 10).

In the first embodiment, the detection point management data is stored in the volatile memory 141 except the parking state. The present disclosure is not limited to this configuration. For example, the detection point management data may be stored in the non-volatile memory 142 in another state of the subject vehicle other than the parking state. It is preferable to store the detection point management data in the volatile memory 141 except the parking state. The obstacle whose detection points in the parking state are stored in the memory may move to another place after the parking is completed. Thus, it is necessary to verify whether the detection points stored in the parking state can be used at the start time of the subject vehicle. By above-described configuration, the verification of stored detection points can be carried out in an easy manner.

In the first embodiment, the periphery monitoring ECU 10 includes the volatile memory 141 and the non-volatile memory 142, both of which store the detection point management data. However, the present disclosure is not limited to this configuration. For example, when the subject vehicle includes a system that enables a communication with a server provided outside of the subject, the detection point management data may be stored in the memory of outside server instead of the memory included in the vehicle. In this case, the information of subject vehicle is acquired by communication with the outside server at the activation time of system.

In the first embodiment, the detection point management data is stored in the non-volatile memory 142 during the parking state of subject vehicle. However, the present disclosure is not limited to this configuration. For example, under a condition that the memory does not erase the contents stored during the parking state of subject vehicle, the detection point management data may be stored in this kind of volatile memory during the parking state of vehicle. An example of the volatile memory that does not erase the contents stored during the parking state of subject vehicle may include a volatile memory whose power supply is always provided regardless of the turn-off of the power switch.

Second Embodiment

Figure 11:
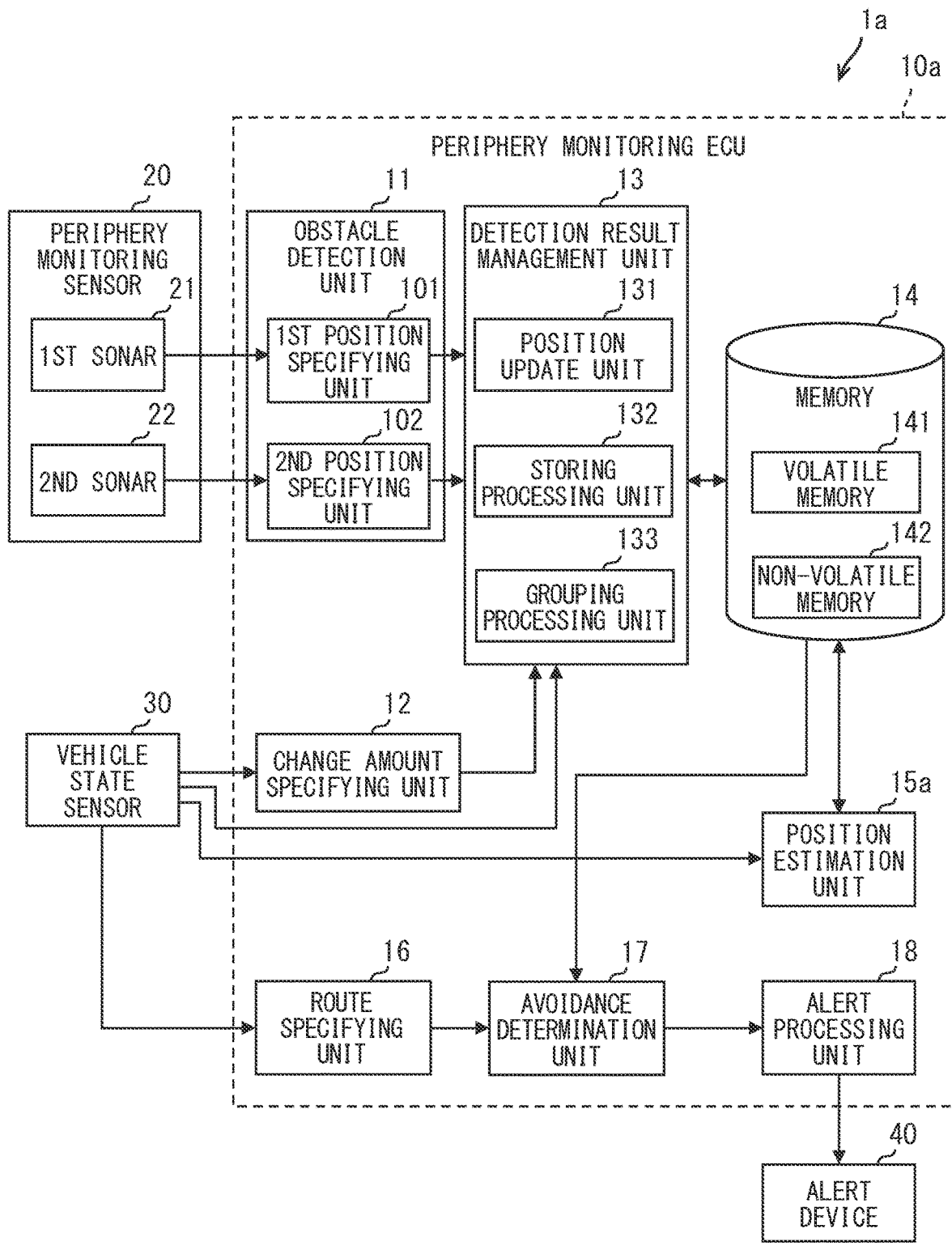
FIG. 11 is a diagram showing an exemplary configuration of a vehicle system 1a and a periphery monitoring ECU.

The present disclosure is not limited to the configuration described in the first embodiment, but can also adopt the following configuration as a second embodiment. The configuration according to the second embodiment will be described below with reference to FIG. 11. A vehicle system 1a shown in FIG. 11 is the same as the vehicle system 1 of the first embodiment except that a periphery monitoring ECU 10a is included instead of the periphery monitoring ECU 10.

In the present embodiment, the periphery monitoring ECU 10a is the same as the periphery monitoring ECU 10 of the first embodiment except that a position estimation unit 15a is provided instead of the position estimation unit 15. The position estimation unit 15a is the same as the position estimation unit 15 of the first embodiment except that a part of process is different from that of the first embodiment. Hereinafter, the different process executed by the position estimation unit 15a from that of the position estimation unit 15 will be described. In the second embodiment, for convenience, a case where two sensor including the first sonar 21 and the second sonar 22 are used as the periphery monitoring sensors 20 will be described as an example.

When the position estimation unit 15a determines that the positions of the detection points corresponding to the same obstacle can be detected by both sonars, the following operation is carried out. The position estimation unit 15 controls the first sonar 21 and the second sonar 22 to perform sensing operation for multiple times. In the actual sensing operation, when the detection point is actually detected by only one sonar at the same detection distance as the detection point determined to be detectable by corresponding sonar, the position of undetectable detection point existing in the blind spot between the detection ranges of two sonars is estimated based on the position of the detection point stored in the non-volatile memory 142. The same distance described here may indicate substantially same distance including an allowable error.

For the positions of the detection points corresponding to the same obstacle, when a detection point determined to be the same as the detection point included in the same group is actually detected by one sonar at the start time of vehicle, the position estimation unit 15a estimates, for a detection point that cannot be detected by both of the two sonars at the start time of vehicle, the position stored in the non-volatile memory 142 as the position of this detection point.

According to the configuration of the second embodiment, an obstacle, which exists in the blind spot between detection ranges and cannot detected by the first sonar 21 and the second sonar 22 at the start time of subject vehicle, can be estimated by the position estimation unit 15a. Thus, when multiple periphery monitoring sensors 20 are used to monitor the periphery of the vehicle, the parked vehicle is started with improved position detection accuracy of the obstacle using the periphery monitoring sensors 20. Thus, the configuration in first embodiment enables an avoidance of the proximity of subject vehicle to the obstacle existing in the blind spot between the detection ranges of the periphery monitoring sensors 20 in the horizontal direction.

Suppose that the positions of the detection points corresponding to the same obstacle are determined to be detectable by both of the first and second sonars. In the actual sensing operation, when the detection point, which is determined to be detectable at the same distance, is not detected by neither the first sonar and the second sonar, the position of detection point, which exists in the blind spot between the detection ranges of two sonars, is not estimated by the position estimation unit 15a based on the position of the detection point stored in the non-volatile memory 142.

For the positions of the detection points corresponding to the same obstacle, when the detection point, which is determined to be detectable by the position estimation unit and located at the same distance as the detection point included in the position group of the detection points, is actually not detected by the multiple periphery monitoring sensors at the start time of vehicle, the position estimation unit 15 does not estimate, for the detection point that cannot be detected by both of the first and second sonars 21, 22 at the start time of vehicle, the position stored in the non-volatile memory 142 as the position of this detection point.

Third Embodiment

In the above-described embodiments, drive support for avoidance of proximity to an obstacle is notified to the driver by an alert. However, the present disclosure is not necessarily limited to this configuration. For example, the steering control of the vehicle may be performed in automatic manner or the steering torque may be increased to support the avoidance of proximity to an obstacle.

Fourth Embodiment

As a fourth embodiment, the functions of the periphery monitoring ECU 10, 10a may be divided by multiple control devices.

Note that the present disclosure is not limited to the embodiments described above and can variously be modified within the scope of the disclosure. An embodiment obtained by appropriately combining the technical features disclosed in the different embodiments is also included in the technical scope of the present disclosure. The periphery monitoring device and the periphery monitoring method described in the present disclosure may be implemented by a special purpose computer which includes a processor programmed to execute one or more functions executed by computer programs. Alternatively, the periphery monitoring device and the periphery monitoring method and the control method described in the present disclosure may be implemented by a special purpose hardware logic circuit. Alternatively, the periphery monitoring device and the periphery monitoring method described in the present disclosure may be implemented by one or more special purpose computers configured by a combination of a processor executing a computer program and one or more hardware logic circuits. The computer programs may be stored, as instructions to be executed by a computer, in a tangible non-transitory computer-readable storage medium.

What is claimed is:

1. A vehicle periphery monitoring device applied to a vehicle, the vehicle being equipped with multiple periphery monitoring sensors and a blind spot existing between two adjacent detection ranges of the multiple periphery monitoring sensors, the vehicle periphery monitoring device comprising:

a detection point position specifying unit that specifies positions of detection points of an obstacle with respect to the vehicle based on detection results of the multiple periphery monitoring sensors;

a position update unit that updates the positions of the detection points, which are successively detected by the detection point position specifying unit, corresponding to a position change of the vehicle;

a storing processing unit that stores the positions of the detection points, which are updated by the position update unit, in a memory that maintains stored information during a parked state of the vehicle;

a position estimation unit that estimates, at a start time of the vehicle from the parked state, a position of a detection point, which is located in the blind spot and is not detected by all of the multiple periphery monitoring sensors at the start time of the vehicle, using the positions of the detection points stored in the memory by the storing processing unit; and a grouping processing unit that classifies the positions of the detection points corresponding to a same obstacle in one position group, wherein, in a case where the positions of the detection points, which are classified by the grouping processing unit in one group and stored in the memory by the storing processing unit, are determined to be included in respective detection ranges of the multiple periphery monitoring sensors at the start time of the vehicle, the position estimation unit:

in response to the detection points, which are determined to be the same as the corresponding detection points included in the position group, being actually detected at the start time of the vehicle by the multiple periphery monitoring sensors, estimates the position of the detection point, which is located in the blind spot and is not detected by all of the multiple periphery monitoring sensors at the start time of the vehicle, with the position stored in the memory by the storing processing unit; and in response to the detection points, which are determined to be the same as the corresponding detection points included in the position group, being actually detected at the start time of the vehicle by only one of the multiple periphery monitoring sensors, does not estimate the position of the detection point, which is located in the blind spot and is not detected by all of the multiple periphery monitoring sensors at the start time of the vehicle, with the position stored in the memory by the storing processing unit, and in a case where the positions of the detection points of the obstacle stored in the storing processing unit is included in a travelling area of the vehicle, an alert device issues an alert to avoid the obstacle in response to a time to collision of the obstacle is less than a predetermined threshold or a distance to the obstacle is less than a predetermined distance.

2. A vehicle periphery monitoring device applied to a vehicle, the vehicle being equipped with multiple periphery monitoring sensors and a blind spot existing between two adjacent detection ranges of the multiple periphery monitoring sensors, the vehicle periphery monitoring device comprising:

a detection point position specifying unit that specifies positions of detection points of an obstacle with respect to the vehicle based on detection results of the multiple periphery monitoring sensors;

a position update unit that updates the positions of the detection points, which are successively detected by the detection point position specifying unit, corresponding to a position change of the vehicle;

a storing processing unit that stores the positions of the detection points, which are updated by the position update unit, in a memory that maintains stored information during a parked state of the vehicle;

a position estimation unit that estimates, at a start time of the vehicle from the parked state, a position of a detection point, which is located in the blind spot and is not detected by all of the multiple periphery monitoring sensors at the start time of the vehicle, using the positions of the detection points stored in the memory by the storing processing unit; and a grouping processing unit that classifies the positions of the detection points corresponding to a same obstacle in one position group, wherein in a case where the positions of the detection points, which are classified by the grouping processing unit in one group and stored in the memory by the storing processing unit, are determined to be included in a detection range of only one of the multiple periphery monitoring sensors at the start time of the vehicle, the position estimation unit:

in response to the detection points, which are determined to be the same as the corresponding detection points included in the position group, being actually detected at the start time of the vehicle by the only one of the multiple periphery monitoring sensors, estimates the position of the detection point, which is located in the blind spot and is not detected by all of the multiple periphery monitoring sensors at the start time of the vehicle, with the position stored in the memory by the storing processing unit; and in response to the detection points, which are determined to be the same as the corresponding detection points included in the position group, being not actually detected at the start time of the vehicle by the only one of the multiple periphery monitoring sensors, does not estimate the position of the detection point, which is located in the blind spot and is not detected by all of the multiple periphery monitoring sensors at the start time of the vehicle, with the position stored in the memory by the storing processing unit, and in a case where the positions of the detection points of the obstacle stored in the storing processing unit is included in a travelling area of the vehicle, an alert device issues an alert to avoid the obstacle in response to a time to collision of the obstacle is less than a predetermined threshold or a distance to the obstacle is less than a predetermined distance.

3. A vehicle periphery monitoring device applied to a vehicle, the vehicle being equipped with multiple periphery monitoring sensors and a blind spot existing between two adjacent detection ranges of the multiple periphery monitoring sensors, the vehicle periphery monitoring device comprising:

a detection point position specifying unit that specifies positions of detection points of an obstacle with respect to the vehicle based on detection results of the multiple periphery monitoring sensors;

a position update unit that updates the positions of the detection points, which are successively detected by the detection point position specifying unit, corresponding to a position change of the vehicle;

a storing processing unit that stores the positions of the detection points, which are updated by the position update unit, in a memory that maintains stored information during a parked state of the vehicle;

a position estimation unit that estimates, at a start time of the vehicle from the parked state, a position of a detection point, which is located in the blind spot and is not detected by all of the multiple periphery monitoring sensors at the start time of the vehicle, using the positions of the detection points stored in the memory by the storing processing unit; and a grouping processing unit that classifies the positions of the detection points corresponding to a same obstacle in one position group, wherein in a case where the positions of the detection points, which are classified by the grouping processing unit in one group and stored in the memory by the storing processing unit, are determined to be included in respective detection ranges of the multiple periphery monitoring sensors at the start time of the vehicle, the position estimation unit:

in response to the detection points, which are determined to be the same as the corresponding detection points included in the position group, being actually detected at the start time of the vehicle by one of the multiple periphery monitoring sensors, estimates the position of the detection point, which is located in the blind spot and is not detected by all of the multiple periphery monitoring sensors at the start time of the vehicle, with the position stored in the memory by the storing processing unit; and in response to the detection points, which are determined to be the same as the corresponding detection points included in the position group, being not actually detected at the start time of the vehicle by neither one of the multiple periphery monitoring sensors, does not estimate the position of the detection point, which is located in the blind spot and is not detected by all of the multiple periphery monitoring sensors at the start time of the vehicle, with the position stored in the memory by the storing processing unit, and in a case where the positions of the detection points of the obstacle stored in the storing processing unit is included in a travelling area of the vehicle, an alert device issues an alert to avoid the obstacle in response to a time to collision of the obstacle is less than a predetermined threshold or a distance to the obstacle is less than a predetermined distance.

4. The vehicle periphery monitoring device according to claim 1, wherein in a case where the positions of the detection points, which are stored in the memory by the storing processing unit, are determined to be not included in either one of the detection ranges of the multiple periphery monitoring sensors at the start time of the vehicle, the position estimation unit estimates the position of the detection point, which is located in the blind spot and is not detected by all of the multiple periphery monitoring sensors at the start time of the vehicle, with the position stored in the memory by the storing processing unit.

5. A vehicle periphery monitoring device applied to a vehicle, the vehicle being equipped with multiple periphery monitoring sensors and a blind spot existing between two adjacent detection ranges of the multiple periphery monitoring sensors, the vehicle periphery monitoring device comprising:

a detection point position specifying unit that specifies positions of detection points of an obstacle with respect to the vehicle based on detection results of the multiple periphery monitoring sensors;

a position update unit that updates the positions of the detection points, which are successively detected by the detection point position specifying unit, corresponding to a position change of the vehicle;

a storing processing unit that stores the positions of the detection points, which are updated by the position update unit, in a memory that maintains stored information during a parked state of the vehicle; and a position estimation unit that estimates, at a start time of the vehicle from the parked state, a position of a detection point, which is located in the blind spot and is not detected by all of the multiple periphery monitoring sensors at the start time of the vehicle, using the positions of the detection points stored in the memory by the storing processing unit, wherein in a case where the positions of the detection points, which are stored in the memory by the storing processing unit, are determined to be not included in either one of the detection ranges of the multiple periphery monitoring sensors at the start time of the vehicle, the position estimation unit estimates the position of the detection point, which is located in the blind spot and is not detected by all of the multiple periphery monitoring sensors at the start time of the vehicle, with the position stored in the memory by the storing processing unit, in a case where the positions of the detection points, which are stored in the memory by the storing processing unit, are determined to be not included in either one of the detection ranges of the multiple periphery monitoring sensors at the start time of the vehicle and a distance from the vehicle to the detection points at the start time of the vehicle is shorter than a predetermined distance, the position estimation unit estimates the position of the detection point, which is located in the blind spot and is not detected by all of the multiple periphery monitoring sensors at the start time of the vehicle, with the position stored in the memory by the storing processing unit, in a case where the positions of the detection points, which are stored in the memory by the storing processing unit, are determined to be not included in either one of the detection ranges of the multiple periphery monitoring sensors at the start time of the vehicle and a distance from the vehicle to the detection points at the start time of the vehicle is equal to or longer than the predetermined distance, the position estimation unit does not estimate the position of the detection point, which is located in the blind spot and is not detected by all of the multiple periphery monitoring sensors at the start time of the vehicle, with the position stored in the memory by the storing processing unit, and in a case where the positions of the detection points of the obstacle stored in the storing processing unit is included in a travelling area of the vehicle, an alert device issues an alert to avoid the obstacle in response to a time to collision of the obstacle is less than a predetermined threshold or a distance to the obstacle is less than a predetermined distance.

6. A vehicle periphery monitoring method applied to a vehicle, the vehicle being equipped with multiple periphery monitoring sensors and a blind spot existing between two adjacent detection ranges of the multiple periphery monitoring sensors, the vehicle periphery monitoring method comprising:

specifying positions of detection points of an obstacle with respect to the vehicle based on detection results of the multiple periphery monitoring sensors;

updating the positions of the detections points, which are successively detected, corresponding to a position change of the vehicle;

storing the updated positions of the detection points in a memory that maintains stored information during a parked state of the vehicle; and estimating, at a start time of the vehicle from the parked state, a position of a detection point, which is located in the blind spot and is not detected by all of the multiple periphery monitoring sensors at the start time of the vehicle, using the positions of the detection points stored in the memory;

classifying the positions of the detection points corresponding to a same obstacle in one position group, wherein, in a case where the positions of the detection points, which are classified in one group and stored in the memory, are determined to be included in respective detection ranges of the multiple periphery monitoring sensors at the start time of the vehicle, in response to the detection points, which are determined to be the same as the corresponding detection points included in the position group, being actually detected at the start time of the vehicle by the multiple periphery monitoring sensors, the position of the detection point, which is located in the blind spot and is not detected by all of the multiple periphery monitoring sensors at the start time of the vehicle, is estimated with the position stored in the memory; and in response to the detection points, which are determined to be the same as the corresponding detection points included in the position group, being actually detected at the start time of the vehicle by only one of the multiple periphery monitoring sensors, does not estimate the position of the detection point, which is located in the blind spot and is not detected by all of the multiple periphery monitoring sensors at the start time of the vehicle, is not estimated with the position stored in the memory, and in a case where the positions of the detection points of the obstacle stored in the memory is included in a travelling area of the vehicle, an alert device issues an alert to avoid the obstacle in response to a time to collision of the obstacle is less than a predetermined threshold or a distance to the obstacle is less than a predetermined distance.

7. A vehicle periphery monitoring device applied to a vehicle, the vehicle being equipped with multiple periphery monitoring sensors and a blind spot existing between two adjacent detection ranges of the multiple periphery monitoring sensors, the vehicle periphery monitoring device comprising:

a computer-readable non-transitory storage medium; and a microcomputer, by executing a program stored in the computer-readable non-transitory storage, configured to:

specify positions of detection points of an obstacle with respect to the vehicle based on detection results of the multiple periphery monitoring sensors;

update the positions of the detections points, which are successively detected, corresponding to a position change of the vehicle;

store the updated positions of the detection points in a memory that maintains stored information during a parked state of the vehicle; and estimate, at a start time of the vehicle from the parked state, a position of a detection point, which is located in the blind spot and is not detected by all of the multiple periphery monitoring sensors at the start time of the vehicle, using the positions of the detection points stored in the memory; and classifying the positions of the detection points corresponding to a same obstacle in one position group, wherein, in a case where the positions of the detection points, which are classified in one group and stored in the memory, are determined to be included in respective detection ranges of the multiple periphery monitoring sensors at the start time of the vehicle, in response to the detection points, which are determined to be the same as the corresponding detection points included in the position group, being actually detected at the start time of the vehicle by the multiple periphery monitoring sensors, the position of the detection point, which is located in the blind spot and is not detected by all of the multiple periphery monitoring sensors at the start time of the vehicle, is estimated with the position stored in the memory; and in response to the detection points, which are determined to be the same as the corresponding detection points included in the position group, being actually detected at the start time of the vehicle by only one of the multiple periphery monitoring sensors, does not estimate the position of the detection point, which is located in the blind spot and is not detected by all of the multiple periphery monitoring sensors at the start time of the vehicle, is not estimated with the position stored in the memory, and in a case where the positions of the detection points of the obstacle stored in the memory is included in a travelling area of the vehicle, an alert device issues an alert to avoid the obstacle in response to a time to collision of the obstacle is less than a predetermined threshold or a distance to the obstacle is less than a predetermined distance.

8. The vehicle periphery monitoring device according to claim 1, wherein the alert device issues comprises a vibrator configured to vibrate a portion of the vehicle that contacts the driver, and in the case where the positions of the detection points of the obstacle stored in the memory is included in the travelling area of the vehicle, the alert device vibrates the portion of the vehicle that contacts the driver to notify the driver in a tactile manner.

* * * * *